United States Patent
Noth et al.

(10) Patent No.: US 11,760,560 B2
(45) Date of Patent: *Sep. 19, 2023

(54) CODE AND CONTAINER OF SYSTEM FOR PREPARING A BEVERAGE OR FOODSTUFF

(71) Applicant: SOCIÉTÉ DES PRODUITS NESTLÉ S.A., Vevey (CH)

(72) Inventors: Andre Noth, Pully (CH); Christian Jarisch, Lutry (CH)

(73) Assignee: Societe des Produits Nestle S.A., Vevey (CH)

( * ) Notice: Subject to any disclaimer, the term of this patent is extended or adjusted under 35 U.S.C. 154(b) by 1300 days.

This patent is subject to a terminal disclaimer.

(21) Appl. No.: 16/078,972

(22) PCT Filed: Feb. 23, 2017

(86) PCT No.: PCT/EP2017/054155
§ 371 (c)(1),
(2) Date: Aug. 22, 2018

(87) PCT Pub. No.: WO2017/144581
PCT Pub. Date: Aug. 31, 2017

(65) Prior Publication Data
US 2019/0055083 A1    Feb. 21, 2019

(30) Foreign Application Priority Data

Feb. 23, 2016  (EP) .................................... 16156864
Feb. 23, 2016  (EP) .................................... 16156870
Nov. 2, 2016   (EP) .................................... 16196876

(51) Int. Cl.
G06K 19/06  (2006.01)
B65D 85/804  (2006.01)
A47J 31/44  (2006.01)

(52) U.S. Cl.
CPC ...... *B65D 85/8043* (2013.01); *A47J 31/4492* (2013.01); *G06K 19/06168* (2013.01); *B65D 2203/00* (2013.01); *B65D 2203/12* (2013.01)

(58) Field of Classification Search
CPC ............... A47J 31/4492; B65D 85/816; G06K 19/06168; G06V 10/48
(Continued)

(56) References Cited

U.S. PATENT DOCUMENTS 10,387,702 B2 *  8/2019  Noth ................. G06K 19/06168
10,478,010 B2 * 11/2019  Noth ................... A47J 31/4492
(Continued)

FOREIGN PATENT DOCUMENTS

AU    2007254626    7/2009
WO    2011152296    12/2011
(Continued)

*Primary Examiner* — Daniel A Hess
(74) *Attorney, Agent, or Firm* — K&L Gates LLP

(57) ABSTRACT

A container for a beverage or foodstuff preparation machine, the container for containing beverage or foodstuff material and comprising a code encoding preparation information, the code comprising a reference portion and a data portion: the reference portion comprising reference units defining a reference line r; the data portion comprising a data unit, wherein said data unit is arranged on an encoding line D that intersects the reference line r, the data unit is arranged a distance d from said intersection as a variable to at least partially encode a parameter of the preparation information, whereby said encoding line D is circular and is arranged with a tangent thereto orthogonal the reference line r at said intersection point, wherein the reference units are arranged with a configuration defining a reference point from which the reference line r extends.

9 Claims, 14 Drawing Sheets

(58) Field of Classification Search
USPC .......................................................... 99/280
See application file for complete search history.

(56) References Cited

U.S. PATENT DOCUMENTS

| | | | | |
|---|---|---|---|---|
| 10,595,669 B2* | 3/2020 | Noth | .................. | B65D 85/8058 |
| 10,740,583 B2* | 8/2020 | Noth | .................. | A47J 31/4492 |
| 10,810,391 B2* | 10/2020 | Noth | .................. | B65D 85/8058 |
| 10,820,746 B2* | 11/2020 | Noth | .................. | B65D 85/8058 |
| 10,827,875 B2* | 11/2020 | Noth | .................. | B65D 85/8058 |
| 2018/0084941 A1* | 3/2018 | Noth | .................. | B65D 85/8046 |
| 2020/0369462 A1* | 11/2020 | Noth | .................. | A47J 31/4492 |

FOREIGN PATENT DOCUMENTS

| | | |
|---|---|---|
| WO | 2014096082 | 6/2014 |
| WO | 2014096405 | 6/2014 |

* cited by examiner

CODE AND CONTAINER OF SYSTEM FOR PREPARING A BEVERAGE OR FOODSTUFF

CROSS REFERENCE TO RELATED APPLICATIONS

The present application is a National Stage of International Application No. PCT/EP2017/054155, filed on Feb. 23, 2017, which claims priority to European Patent Application No. 16156864.7, filed on Feb. 23, 2016, European Patent Application No. 16156870.4, filed on Feb. 23, 2016, and European Patent Application No. 16196876.3, filed on Nov. 2, 2016, the entire contents of which are being incorporated herein by reference.

TECHNICAL FIELD

The described aspects and embodiments relate generally to beverage or foodstuff preparation systems which prepare a beverage or foodstuff from containers such as coffee capsules, and in particular to codes arranged on the container that encode preparation information for reading by a machine of said system.

BACKGROUND

Increasingly, systems for the preparation of a beverage or foodstuff are configured to operate using a container that comprises a single-serving of a beverage or foodstuff material, e.g. coffee, tea, ice cream, yoghurt. A machine of the system may be configured for preparation by processing said material in the container, e.g. with the addition of fluid, such as milk or water, and the application of mixing thereto. Such a machine is disclosed in PCT/EP2013/072692. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or material therein is: encoded in a code on the container; read by the machine; decoded; and used by the machine to optimise the preparation process. In particular, the preparation information may comprise operational parameters of the machine, such as, for example but not exclusively: fluid temperature; preparation duration; mixing conditions; and fluid volume.

Accordingly, there is a need to code preparation information on the container. Various codes have been developed. An example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 A1 discloses a container with a 2D barcode, which has a higher albeit limited encoding density.

Thus in spite of the considerable effort already invested in the development of said systems further improvements are desirable.

SUMMARY

An object of the present disclosure is to provide a container of a beverage or foodstuff system that comprises a code that has a high encoding density. It would be advantageous to provide such a code that is less visible than the prior art. It would be advantageous to provide such a code that is un-complicated such that it does not comprise a large number of symbols. It would be advantageous to provide such a code that can suitably encode parameters of the preparation information that have a wide numerical range. It would be advantageous to provide such a code that is cost-effective to produce and that can be read and processed by a cost-effective code processing subsystem. It would be advantageous to provide such a code that can be reliably read and processed.

Disclosed herein according to a first aspect is a container for use (e.g. it is suitably dimensioned) by a beverage or foodstuff preparation machine, in particular the machine according to the fourth aspect. The container is suitable for containing beverage or foodstuff material (e.g. it has an internal volume and may be food safe). The container may be a single-serving container, i.e. it is dimensioned for containing a dosage of beverage or foodstuff material for preparation of a single serving (e.g. pre portioned) of said product. The container may be a single-use container, i.e. it is intended to be used in a single preparation process after which it is preferably rendered unusable, e.g. by perforation, penetration, removal of a lid or exhaustion of said material. In this way the container may be defined as disposable. The container comprises (e.g. on a surface thereof) a code encoding preparation information, the code comprising a reference portion and a data portion. The reference portion comprising reference units defining a reference line r, which is linear. The data portion comprising at least one data unit, wherein the data unit is arranged on (e.g. with at least a portion thereof, generally a centre, intersecting said line) an encoding line D that intersects the reference line r, the data unit is arranged a distance d extending along said encoding line D from said intersection (i.e. a circumferential distance) as a variable to at least partially encode a parameter of the preparation information (e.g. a parameter is entirely encoded by the data unit only or is encoded by several data units, which may be arranged on the same or different encoding lines, and/or is encoded in addition by metadata), whereby said encoding line D is semi (i.e. it comprises a segment of a circle) or fully circular and is arranged with a tangent thereto orthogonal the reference line r at said intersection point. The reference units preferably define a configuration, which may be referred to as a reference configuration, said configuration defining a reference point from which the reference line r extends. The configuration is preferably unique, such that said configuration does not appear elsewhere in the code. The configuration preferably comprises at least one of the reference units arranged nonlinear and/or the configuration forms an irregular polygon.

One advantage of defining the reference point with such a configuration of reference units is that its location can be accurately determined. Particularly when compared to the use of a single reference unit to define said point. In this way the reference line r can be more accurately defined and thus data encoded. An advantage of having a configuration comprising at least one of the reference units arranged nonlinear, the configuration forming for example an irregular polygon, is that the configuration can be considered as having a unique orientation that may be used to at least approximately determine the direction of the reference line r.

One advantage of having a circular extending encoding line D is that, for processing, a Polar coordinate system can be utilised, whereby: the origin is typically the reference point of the configuration, said reference point is arranged at an axial centre of the encoding line; each data unit has a radial distance from the origin; each data unit has an angle defined as between the reference line r and a radial line to the data unit. The distance d can be determined conveniently by the said angle and optionally said radial distance. Image processing of a code using this coordinate system is less computationally intensive than for an example code that uses a Cartesian coordinate system, whereby the axis are defined by a reference line and a linear encoding line that extends orthogonally thereto. In particular a Cartesian arrangement requires the image of the code reorienting during processing which is obviated when using a Polar coordinate system. In this way a more cost-effective image processor can be used. Moreover the code has a high encoding density since a plurality of encoding lines D can be arranged concentrically about the origin, with each comprising one or more associated data unit.

The preparation information may comprise information that is related to a preparation process, e.g. one or more parameters used by the machine such as: temperature; torque and angular velocity (for mixing units of machines which effect mixing); flow rate and/or volume; pressure; % cooling power; time (e.g. for which a phase comprising one or more of the aforesaid parameters are applied for); expiry date; container geometric properties; phase identifier (for containers comprising multiple codes, whereby each of which encodes a distinct phase of a preparation process); container identifier; recipe identifier that may be used to retrieve one or more parameters of the machine which are used by the machine to prepare the product, wherein said parameters may be stored on the machine; pre-wetting volume.

A code, for example when the code is printed and/or embossed on a container, preferably has a planform with a peripheral length (e.g. a diameter of a circular periphery or side length of a rectangular periphery) of 600-1600 μm or 600-6000 μm. One advantage is that the code applied on the container is not particularly visible, even if it comprises several units. A further advantage is that capturing an image of the code for reading and decoding the information contained therein can be done with a small image capturing device, for example with a camera having dimensions in the magnitude of a few millimetres, whose size provides for an easy and reliable integration in a machine according to the fourth aspect. More particularly, the data units and reference units that comprise the code preferably have a length of 50-250 μm. The aforesaid length may be defined as: a diameter for a substantially circular data or reference unit; a side length for a quadrilateral data or reference unit; other suitable measure of length for a data or reference unit of another shape.

One advantage of a rectangular planform of the code is that it forms a tessellating shape. A tessellating shape is particularly advantageous since a plurality of codes can be compactly repeated on the container, e.g.: for read error checking, thereby allowing the design of robust code decoding algorithms able to correct code reading and/or decoding errors using several codes encoding the same information and thus minimizing the code reading failure rate; and/or with separate phases of a preparation process encoded by each code or group of codes. Accordingly, the first aspect may comprise a plurality of the said codes formed on a container in an at least partially tessellating manner (e.g. a grid with adjacent columns aligned or with adjacent columns offset), whereby the codes preferably encode different phases of a preparation process.

Encoding several phases of a preparation process on a container allows for example encoding all parameters necessary for the preparation of complex recipes, for example recipes comprising several preparation phases and/or recipes requiring simultaneous or sequential processing of two or more containers and/or of two or more ingredients in two or more compartments within the same container, in order to obtain two or more ingredients such as for example milk and coffee, ice-cream and topping, milkshake and flavouring, etc.

According to the invention, all processing parameters necessary for a recipe being preferably encoded in one or more codes on the corresponding one or more containers, recipes may be updated by providing containers with updated codes thereon, said updated codes encoding updated/modified/new parameter values. New recipes and/or new containers with specific parameter values may furthermore be introduced and processed by a machine according to the fourth aspect without reprogramming of the machine. Accordingly, updated and/or new recipes may be introduced in the system of the invention without having to update the machine's soft- or firmware.

The attachments according to the further aspects may also comprise the aforesaid plural code arrangement.

The reference units of the configuration may all be of the same individual configuration, for example, in terms of one or more of shape, colour and size. One advantage is that for processing, data and/or reference units of the code need only be identified as present, as opposed to in addition being identified by their individual configuration, whereby the location of the configuration is determined based on the associated reference units' spatial configuration, typically the points of the centres thereof, rather than the individual reference unit configuration. In this way processing overhead is reduced thereby enabling a more cost effective processor to be used.

The reference line r may extend through or from at least one selected from a group comprising the following geometric terms in respect of the configuration: a centre of symmetry; a centroid; a line of symmetry. In addition or as an alternative, said reference line r may extend through or parallel to one or more reference units of the configuration. Herein through a reference unit is typical taken to mean though its centre. One advantage is that the reference line r can be conveniently determined once said configuration has been identified. The reference point is preferably arranged at the aforesaid geometric term of the group. One advantage is that the reference point can be conveniently determined once said configuration has been identified.

The arrangement of reference units of the configuration may be selected from a group consisting of: a triangle (such as a right-angled triangle; an equilateral triangle; an isosceles triangle); a square; another regular or irregular polygon with up to 8 vertices. Herein the said arrangement of the configuration is preferably defined by the centres of the associated reference units at the vertices. One advantage is that with simple configurations of reference units the configuration can be conveniently identified, e.g. by locating the centres of the reference units and searching for the formation of a shape corresponding to that of the configuration.

The configuration may have a right-angled triangle arrangement, whereby the vertices of said triangle (e.g. the points defined by the centres of the reference units) are arranged on a circular line, which is concentric the encoding line D such that the reference point is arranged at the centre of the circular line. With such an arrangement a radially extending reference line r can be defined to extend parallel to a line extending through two of the reference units. One advantage is that the configuration is compactly located within the encoding line(s).

Alternatively, the configuration may have a right-angled triangle arrangement, whereby the reference point is arranged between two of the triangle's three vertices and the reference line r extends from the reference point through one of said two vertices.

The configuration may be arranged with the reference point at the centre of the circular encoding line. One advantage is that the centre of the Polar coordinate system can be conveniently determined by locating the configuration. The configuration is preferably located entirely within a locus defined by the or each encoding line D.

The configuration may have an arrangement from which a single direction of the reference line r can be uniquely identified. Said arrangement may be achieved by configuring the arrangement to have a single line of symmetry through which the reference line r extends, or may extend parallel thereto. Said arrangement may be achieved by configuring the arrangement to have a side defined by one or more reference units through which the reference line r extends, or may extend parallel thereto, in particular said side may have a characteristic spacing of reference units and/or a particular orientation with respect to other reference units of the configuration, such as a right angled triangle whereby the adjacent or opposite side has the reference line r extending therethrough, or extending parallel thereto. One advantage is that the configuration can define a direction of the reference line r.

According to the invention, the code thus comprises reference units defining a reference point and a reference line for determining the centre and orientation of the polar code. There is therefore no requirement of a specific alignment of the container relative to the image capturing device when placed in the machine of the fourth aspect for processing. The code processing subsystem will be able to determine the centre and orientation of the code with the position of the reference units in a captured image, independently of the relative orientation of the container and the image capturing device when the image was taken.

The code may comprise a plurality of discrete positions, whereby said discrete positions either comprise or do not comprise a unit, preferably as a variable to at least partially encode a parameter of the preparation information. In embodiments, at least one of said positions comprises a unit for use as part of the reference portion. It will be appreciated that when used to encode data such discrete positions form part of the reference portion and data portion. The or each such discrete position may be arranged external a locus defined by the or each encoding line D, i.e. it is on an outer periphery of the line rather than at its interior closed region. One advantage is that the configuration can be used to determine an approximate direction of the reference line r from which the approximate locations of such stored discrete positions can be determined. Said positions, which are predefined known positions relative to the configuration, i.e. to the reference line r, can subsequently be checked for a data unit and if a data unit is present then the direction of the reference line more accurately determined using the data unit, preferably the location of its centre, as a reference. One advantage is that such an arrangement obviates the need for a dedicated reference unit on the outer of the encoding line D, which would otherwise consume space that could be used to encode data. The encoding line D may be arranged within a rectangular planform, wherein these discrete positions are arranged within said planform and are proximal one or more vertices thereof. One advantage is that the encoding density is maximised, especially for tessellating configurations of codes.

Alternatively or in addition to the above, one or more discrete positions may be arranged on one or more encoding lines D. They may be arranged proximal the data unit on the encoding line D, for example, at a greater or lesser distance from the reference line r than the corresponding data unit. Preferably, said discrete positions are arranged at predetermined distances from the data unit, i.e. their location is defined relative to the distance d at which the corresponding data unit has been arranged to encode a parameter. One advantage of arranging discrete positions on encoding lines D is that the amount and format of data (e.g. continuous and discrete) can be increased.

In particular, according to the parameter type, the parameters can selectively be encoded using the data units of the discrete positions or data units that may be arranged at any distance along one or more encoding line D. Parameters which can only assume discrete values are preferably encoded by data units at the discrete positions, such as one or more of: expiry date; phase identifier; container or product identifier; and container geometric properties e.g. volume; an exponent or a sign that may be associated with a parameter encoded by a data unit arranged at a distance d on an encoding line D; a recipe identifier that may be used to retrieve one or more parameters of the machine which are used by the machine to prepare the product, wherein said parameters may be stored on the machine; the identifier of a formula or lookup table associated with a parameter encoded by a data unit arranged at a distance d on an encoding line D. Parameters which can assume a wide range of values, which may be continuous, are preferably encoded via data units arranged at any distance on one or more encoding lines D, such as one or more of: temperature; fluid volume; flow rate; torque and angular velocity; time; % cooling power. Moreover a particular parameter may be encoded by both a data unit arranged on the encoding line D and data units of the discrete positions, e.g. the data units of the discrete positions encode an exponent or sign associated with the value encoded by the data unit arranged on the encoding line D.

In embodiments there may be a plurality of codes, wherein a reference line r of a code is determined by the configuration of reference units of the code and a like configuration of reference units of one or more further codes, preferably an adjacent code. The codes may be arranged such that reference line r of a code extends through a reference point defined by the configuration of one or more further codes, preferably of an adjacent code. Alternatively the reference line may be arranged to extend at a known position with respect to the reference point defined by the configuration of one or more further codes, preferably of an adjacent code.

One of more of the following may have the same individual configuration, preferably in terms of one or more of shape, colour and size: the reference units of the configuration; further reference units; one or more of the data units. Preferably all the reference units and/or all of the data units that comprise the code have the same individual configuration. One advantage is that processing overhead is reduced thus enabling a more cost effective processor.

A data unit may be arranged on the encoding line at any continuous distance d along the encoding line from the intersection point. One advantage is that the code has a high encoding density as it can encode information in a continuous manner rather than in a discrete manner. Alternatively or in combination thereof, data units may be arranged at discrete distances (i.e. said data units occupy one of a plurality of predetermined discrete positions along the line D, which generally do not overlap and may have a discrete separation between adjacent positions), said discrete distances being defined from the intersection point or preferably from a data unit, or a group of data units, encoding information in a continuous manner as explained above. In the instance of more than one encoding lines D and/or more than one data units arranged along the line(s), the data units may be arranged with combinations of continuous and discrete distances.

The data portion may have an encoding area, within which the encoding lines D are arranged, the data units thereof being arranged within the bounds of the encoding area. The encoding area is preferably circular at a periphery, whereby the encoding lines D preferably extend concentrically about an axial centre thereof. More particularly, the encoding area may be annular. One advantage is that with an annular arrangement the data units are not arranged in close proximity to the axial centre of the annuli where the circumferential distance of the encoding line D is less such that there is less precision in the determined distance d. A portion of the encoding area may be bounded by the reference line r, e.g. the encoding area is annular and is radially intersected by the reference line r. The reference units are preferably arranged outside the encoding area, preferably in close proximity to the axial centre of the annuli.

In embodiments, a data unit may be arrangeable up to the reference line r but not overlapping, i.e. a periphery of the data unit can be coincident to and extend from the reference line. Alternatively, a data unit is not arrangeable coincident the reference line r, the closest distance thereto being proximal but with a predetermined minimum distance therefrom. One advantage is that there is sufficient separation between the reference line r and data units for processing. Preferably the data and/or reference units are not arranged overlapping each other.

The encoding line D may intersect the reference line r at a reference position and the reference position is preferably absent a reference unit, whereby the or each reference position is arranged a predetermined distance along the reference line, e.g. from the or each reference unit of the configuration or other position. Preferably the reference units are arranged external (i.e. not arranged within) the encoding area. One advantage is that the encoding density is increased since the data units can be arranged in close proximity to the reference line r, e.g. without needing to ensure there is adequate separation between the data unit and a reference unit that would otherwise be on said line. The aforesaid predetermined distance can be defined as a set amount such that the adjacent reference positions are equidistant e.g. a distance between the ends of the reference line r divided by a number of reference positions.

The data unit may further encode metadata associated with the parameter. The metadata is preferably encoded discretely (e.g. it can assume one of a predetermined number of values). The metadata is generally to: enable identification of the particular parameter; and/or a property associated with the parameter (e.g. a ± or an exponent). A unit length of a data unit may be selected from one of a plurality of predetermined unit lengths as a variable to encode the metadata. The aforesaid unit length may be defined as: a diameter for a substantially circular unit; a side length for a quadrilateral unit; other suitable measure of length for a unit of another shape of unit. An offset of a centre of a data unit from the encoding line D along a line, the line extending radially from an axial centre of the circular encoding line D, may be selected from one of a plurality of predetermined offsets as a variable to encode the metadata. Preferably said offset is achieved within the bounds of at least part of the associated data unit intersecting the encoding line D.

The data portion may comprise a plurality of encoding lines D (e.g. up to 2, 3, 4, 5, 6, 10, 16, 20 or more), each comprising a corresponding arrangement of a data unit (i.e. the data unit is arranged a distance d along the corresponding encoding line from an intersection point to at least partially encode a parameter) and/or of discrete positions for one or more data units. Preferably, the encoding lines D are concentrically arranged and preferably intersect the reference line r at a different position.

Moreover a plurality of data units may be arranged along a single encoding line D. One advantage is that the encoding density is increased. In such an arrangement each data unit may be identifiable by the metadata. Each of the said data units may encode a separate parameter. Alternatively a plurality or group of data units may encode a single parameter, whereby a distance d encoding said parameter may be a function (e.g. an average or a multiple) of the distances of said plurality of data units or of the data units of said group.

The data units and reference units may be formed by one of the following: printing (e.g. by a conventional ink printer; one advantage is that the code can be conveniently and cost-effectively formed); engraving; embossing. The code may be formed directly on a surface of the container, e.g. the substrate for the units is integral with the container. Alternatively the code may be formed on an attachment, which is attached to the container, for example but not exclusively on a label, on a thermal shrink sleeve and/or on a lid of the container.

The container may comprise the beverage or foodstuff material contained therein. The container may comprise one of the following: capsule; packet; receptacle for end user consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application.

Disclosed herein according to a second aspect is a method of encoding preparation information, the method comprising forming a code on: a container for a beverage or foodstuff preparation machine, the container for containing beverage or foodstuff material; or an attachment for attachment to said container or said machine. The method may comprise encoding information with the code according to any feature of the first aspect. In particular the method may comprise: arranging reference units to define a configuration defining a reference point from which a reference line r of a reference portion extends; and at least partially encoding a parameter of the preparation information with a data portion of the code by arranging a data unit or a group of data units, for example a pair of data units, on an encoding line D that intersects the reference line r, the data unit or group of data units being arranged any distance d extending along the encoding line D from said intersection as a variable for said encoding, whereby said encoding line D is circular and is arranged with a tangent thereto orthogonal the reference line rat said intersection point. The method may further comprise at least partially encoding a parameter of the preparation information with one or more discrete positions, which are arranged in operative proximity to the reference line r, wherein said discrete positions either comprise or do not comprise a data unit as a variable to at least partially encode a parameter of the preparation information. At least part of the discrete positions may in particular be arranged on one or more encoding lines D, wherein the locations of the discrete positions is defined relative to the corresponding data unit or group of data units. The method may comprise forming the code by one of the following: printing; engraving; embossing. The method may comprise forming a plurality of codes of said code preferably in an at least partially tessellating arrangement.

Disclosed herein according to a third aspect is a method (e.g. a computer implemented method) of decoding preparation information, the method comprising obtaining a digital image of a code of a container according to the first aspect, or the attachments according to the seventh and eighth aspects; processing said digital image to decode the encoded preparation information.

Processing of the digital image to decode the preparation information may comprise: locating the reference and data units of the code; at least approximately determining therefrom a reference line r, determining (i.e. for the or each of the encoding lines D) for a data unit or a group of data units a distance d along the encoding line D from the reference line r; converting the determined distance d into an actual value of a parameter $V_p$. In embodiments, the processing of the digital image to decode the preparation information further comprises determining the location of one or more discrete positions at a stored location relative to the configuration and/or relative to the data unit or group of data units of one or more encoding lines D, determining if they comprise a data unit, deriving therefrom a parameter.

The locating of the units of the code (i.e. data and reference units) may comprise one or more of the following: conversion of the digital image to a binary image; determining a centre of the units by feature extraction; determining a size/area/shape of the units by pixel integration (i.e. determining a number of pixels of a shaded region that comprise the unit).

Determining therefrom a reference line r may comprise identifying a configuration of reference units. Identifying a configuration of reference units may comprise locating reference units which have a particular unique configuration, which is preferably defined by the centre points of the units. Typically the configuration is stored on a memory unit of the machine, such as a look-up table, which may comprise the memory subsystem. Determining the reference line r from the configuration may comprise determining therefrom a reference point from which reference line r extends. The location of the reference point is preferably arranged at a specific location with respect to the configuration. Typically the said location is stored on a memory unit of the machine, such as a look-up table, which may comprise the memory subsystem.

Determining the reference line r from the configuration may further comprise identifying a single unique direction from the arrangement of the reference units, e.g. by searching for a line of symmetry or a side as defined above.

Determining the reference line r may further comprise identifying a reference and/or data unit arranged at least at one of a plurality of discrete positions which are preferably arranged external a locus defined by the or each encoding line D and whose location is defined relative to the configuration and typically stored on a memory unit of the machine, such as a look-up table, which may comprise the memory subsystem. In particular it may comprise refining or correcting an initial position of the reference line r at least approximately determined using the configuration by using the reference and/or data unit of said at least one discrete position.

In embodiments comprising a plurality of codes of such code arranged for example at least partly in a tessellating manner, determining the reference line r for a code may further comprise determining the reference line as extending from the reference point of the configuration of the code in a direction previously approximated from the configuration of the code, and through or in relation to a reference point defined by the configuration of at least one other code, preferably an adjacent code.

Determining the reference line may comprise a combination of any two or more of the above determination steps.

Determining for each data unit a distance d along the encoding line D from the reference line r may comprise determining a circumferential distance, i.e. by means of the angle observed at the centre of the encoding line (typically the reference point of the configuration) between the reference line r and the data unit together with the radial distance of said data unit from said centre. Alternatively it may comprise determining an angular distance, i.e. by means of the angle observed at the centre of the encoding line between the reference line r and the data unit, whereby the radial distance may be used to identify the data unit with respect to a reference position. The latter is preferably since less processing steps are required. In each case the distance may be corrected to account for magnification/reading distance.

Converting the determined distance d into an actual value of a parameter $V_p$ may comprise converting the determined distance d into an actual value of a parameter $V_p$ using a stored relationship (e.g. information stored on a memory unit of the machine, which may comprise the memory subsystem) between the parameter and distance d. The relationship may be linear, e.g. $V_p \propto d$ and/or it may be non-linear. The relationship may comprise at least one selected from a group consisting of: a logarithmic relationship, e.g. $V_p \propto \log(d)$; an exponential relationship, e.g. $V_p \propto e^d$; a polynomial; a step function; linear. Exponential and logarithmic relationships are particularly advantageous when the accuracy of a parameter is important at low values and less important at high values or the converse respectively. Typically the relationship is stored as an equation or as a lookup table. The relationship may be applied to any suitable variable of the preparation information, such as: temperature; torque; flow rate/volume; pressure; % cooling power. One advantage is the execution of complex recipes, which may be determined by the particular material in the container and the functionality of the machine.

Processing of the digital image to decode the preparation information may further comprise determining metadata associated with the data unit of the encoded parameter, e.g. by one or more of the following: determining a unit length of a data unit; determining an offset of a data unit to the encoding line D. The aforesaid determining may be by feature extraction or overall area/shape by pixel integration.

Determining the location of one or more discrete positions may comprise using the identified position of the reference line r. It may further comprise using: stored information, e.g. there are a known number of discrete positions arranged at known locations with respect to the position of the reference line r; and/or with respect to the arrangement of a data unit or a group of data units along an encoding line D. Determining if the discrete positions comprise a data unit may comprise feature extraction or other known technique. Deriving from the presence of the data units at the discrete positions a parameter may comprise using stored information (e.g. a look up table) to decode the encoded parameter(s).

Disclosed herein according to a fourth aspect is provided a beverage or foodstuff preparation machine comprising: a container processing subsystem to receive a container according to the first aspect and to prepare a beverage or foodstuff therefrom; a code processing subsystem operable to: obtain a digital image of the code of the container; process said digital image to decode the encoded preparation information; a control subsystem operable to effect one or more of the following: control of said container processing subsystem using said decoded preparation information; use of the preparation information to monitor container consumption for re-ordering, e.g. via a server system through a communication interface; use of the preparation information to determine if a container has exceeded its expiry date. The code processing subsystem may further be configured to process the digital image of the code according to the method of the third aspect.

Control of said container processing subsystem using said decoded preparation information may in particular comprise executing a preparation process in phases, whereby preparation information for the phases is decoded from a code and/or from a plurality of codes encoding a plurality of phases as according to the first aspect. Said decoded preparation information for several phases may for example be used to control the container processing subsystem to perform complex recipes implying for example processing of two or more containers, and/or processing of two or more ingredients in several individual compartments within a same container, preferably upon a single user actuation, for example upon a single push of a button of the machine's user interface. In embodiments, based for example on the information decoded from a first container, the control subsystem checks for the presence in the machine of a particular second container or ingredient compartment, before or after processing the first container or ingredient compartment, and pauses the preparation process if said second container or ingredient compartment cannot be found. Once a second container or ingredient compartment of the expected type is detected in the machine, the preparation process is resumed and the second container or ingredient compartment is processed.

The container processing subsystem generally is operable to perform said preparation by the addition of fluid, such as water or milk to the beverage or foodstuff material. The container processing subsystem may comprise one of an: an extraction unit; a dissolution unit; a mixing unit. The container processing subsystem may further comprise a fluid supply that is operable to supply fluid to the aforesaid unit. Generally the fluid supply comprises a fluid pump and a fluid heater. The aforesaid units may be configured for operation with one or more container containing beverage or foodstuff material.

Disclosed herein according to a fifth aspect is provided a beverage or foodstuff preparation system comprising a container according to the first aspect and a beverage or foodstuff preparation machine according to the fourth aspect.

Disclosed herein according to a sixth aspect is provided a method of preparing a beverage or foodstuff using the system according to the fifth aspect, the method comprising: obtaining a digital image of a code according to the first aspect (which may be arranged on the container or the attachments according to further aspect); processing said digital image to decode the encoded preparation information; operating a control subsystem to effect one more of the following: control of said container processing subsystem using said decoded preparation information; use of the preparation information to monitor container consumption for re-ordering, e.g. via a server system through a communication interface; use of the preparation information to determine if a container has exceeded its expiry date. The method may further comprise any of the steps of processing the digital image of the code according to the method of the third aspect.

Disclosed herein according to a seventh aspect is provided an attachment configured for attachment to a container for a beverage or foodstuff preparation machine according to the fourth aspect. The container is preferably according to any feature of the first aspect, preferably without the code thereon. The attachment may comprise: a carrier carrying (e.g. on a surface thereof) a code according to the first aspect; an attachment member for attachment to said container. The attachment is preferably configured for attaching said carrier to the container as if the code were formed integrally on the container. In this way the code can be read by an image capturing device as if it were formed integrally thereon. The attachment may be configured to extend over a substantial portion of the container, e.g. a base or lid or rim. Examples of suitable attachment members comprise: an adhesive strip (or a planar region for receiving adhesive); a mechanical fastener such as a clip or bolt.

Disclosed herein according to an eighth aspect is provided an attachment configured for attachment to a beverage or foodstuff preparation machine according to the fourth aspect. The attachment may comprise: a carrier carrying (e.g. on a surface thereof) a code according to first aspect; an attachment member for attachment to said machine. The attachment member is preferably configured for attaching said carrier to the machine at a position between an image capturing device of said machine and the container when received, such that the code thereon is proximate said container. In this way it can be read by the image capturing device as if it were attached to the container. Examples of suitable attachment members comprise: extensions attached to said carrier comprising an adhesive strip (or a planar region for receiving adhesive) or a mechanical fastener such as a clip, bolt or bracket.

Disclosed herein according to a ninth aspect is provided a use of a container as defined in the first aspect or the attachments as defined in the seventh and eighth aspect for a beverage or foodstuff preparation machine as defined in the fourth aspect.

Disclosed herein according to a tenth aspect is provided a use of a code as defined in the first aspect for encoding preparation information, preferably on: a container of a beverage or foodstuff preparation machine, the container for containing beverage or foodstuff material as defined in the first aspect; or an attachment according to the seventh or eighth aspect.

Disclosed herein according to a eleventh aspect is provided a computer program executable on one or more processors of a code processing subsystem of a beverage or foodstuff preparation machine generally as defined in the fourth aspect to decode encoded preparation information. The computer program may comprise program code executable by the or each processor and/or program logic implemented on the or each processor (it may also comprise program code for implementation of said program logic). The computer program may be operable to decode the information of the code according to any feature of the first aspect via any feature of the third aspect. The computer program may further be executable to obtain (e.g. by controlling an image capturing device) said digital image of the code.

The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

Disclosed herein according to an twelfth aspect is provided a non-transitory computer readable medium comprising the computer program according to the eleventh aspect. The non-transitory computer readable medium may comprise a memory unit of the processor or other computer-readable storage media for having computer readable program code for programming a computer stored thereon, e.g. a hard disk, a CD-ROM, an optical storage device, a magnetic storage device, Flash memory; a storage device of a server for download of said program. The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

Disclosed herein according to a thirteenth aspect is an information carrying medium comprising the code according to the first aspect. In particular the information carrying medium may comprise the container as defined herein, either of the attachments as defined herein, or a substrate, such as an adhesive strip of other suitable medium.

The method of encoding preparation information according to the second aspect may be applied to the information carrying medium. The method of decoding preparation information according to the third aspect may be applied to the information carrying medium. The beverage or foodstuff preparation machine according to the fourth aspect may be configured for operation with the information carrying medium, e.g. via its attachment to the container or other suitable component, such as either of the aforedescribed attachments. The system according to the fifth aspect may comprise the information carrying medium. The method of preparing a beverage or foodstuff of the sixth aspect may be adapted to comprise obtaining a digital image of the code of the information carrying medium.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above aspects may be combined in any suitable combination to provide further embodiments. Moreover comprising herein is to be understood as non-limiting. Other features, aspects, and advantages of the subject matter described herein will become apparent from the following Detailed Description, Figures, and Claims.

DETAILED DESCRIPTION OF EXEMPLARY EMBODIMENTS

Beverage/Foodstuff Preparation System

Figure 1A:
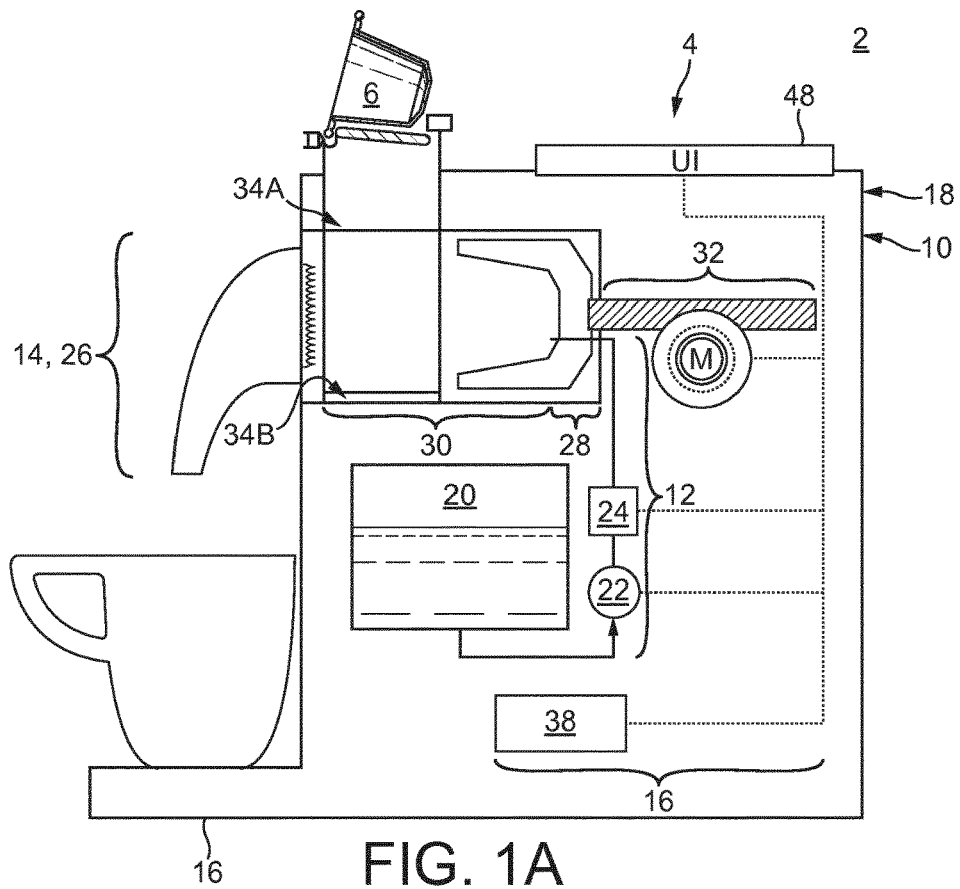
FIG. 1 is a diagrammatic drawing illustrating embodiments of beverage or foodstuff preparation systems that comprises a machine and a container according to embodiments of the present disclosure.

A beverage or foodstuff preparation system 2, an embodiment of which is illustrated in FIG. 1, comprises: a beverage or foodstuff preparation machine 4; a container 6, which are described further below.

Preparation Machine

The beverage or foodstuff preparation machine 4 is operable to process a beverage or foodstuff material (hereon material) arranged in the container 6 to a beverage and/or foodstuff for consumption by drinking and/or eating. Generally processing comprises the addition of fluid, such as water or milk to said material. A foodstuff material as defined herein may comprise a substance capable of being processed to a nutriment generally for eating, which may be chilled or hot. Generally the foodstuff is a liquid or a gel. Non-exhaustive examples of which are: yoghurt; mousse; parfait; soup; ice cream; sorbet; custard; smoothies. Generally the foodstuff is a liquid, gel or paste. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The machine 4 is generally dimensioned for use on a work top, i.e. it is less than 70 cm in length, width and height.

The machine 4 comprises: a housing 10; a container processing subsystem 14; a control subsystem 16; and a code processing subsystem 18.

Housing

The housing 10 houses and supports the aforesaid machine components and comprises: a base 108 for abutment of a horizontally arranged support surface; a body 110 for mounting thereto said components.

Container Processing Subsystem

Depending on the particular embodiment the container processing subsystem 14 (which may also be considered a preparation unit) may be configured to prepare a foodstuff/ beverage by processing material arranged in: one or more single-serving, single use container 6 that is a packet and/or capsule; a container 6 that is a receptacle for end-user consumption therefrom. In particular the material is processed to effect a change of its composition, e.g. by dissolution or extraction or mixing of an ingredient thereof. Embodiments of each configuration will be discussed.

Two or more such configurations may be combined in a single container processing subsystem 14 in order for example to prepare a foodstuff/beverage from material contained in two or more containers 6 and requiring different processing. In embodiments, a container processing subsystem 14 may for example be configured to simultaneously or sequentially: in a pressurised extraction unit, extract coffee from a capsule containing ground coffee and; in a dissolution unit, dilute powdered milk contained in a packet; in order to prepare a milk and coffee beverage such as for example a cappuccino, a cafe latte or a latte macchiato. In other embodiments, a container processing subsystem 14 may for example be configured to simultaneously or sequentially: prepare at least part of a foodstuff/beverage in a receptacle for end user consumption in a mixing unit and; possibly dilute material contained in a container and dispense it into the receptacle; in order for example to prepare a serving of ice-cream with topping or a flavoured milk-shake. Other feature combinations in a single container processing subsystem 14 are however possible within the frame of the invention in order to allow the preparation of foodstuff/ beverages according to other complex recipes.

In general in all the embodiments the container processing subsystem 14 comprises a fluid supply 12 that is operable to supply fluid to the container 6. The fluid is in general water or milk, the fluid may be conditioned (i.e. heated or cooled). The fluid supply 12 typically comprises: a reservoir 20 for containing fluid, which in most applications is 1-5 litres of fluid; a fluid pump 22, such as a reciprocating or rotary pump that may be driven by an electrical motor or an induction coil (although in one example the pump may be replaced with connection to a mains water supply); an optional fluid thermal exchanger 24 (typically a heater), which generally comprises an in-line, thermoblock type heater; an outlet for supplying the fluid. The reservoir 20, fluid pump 22, fluid heater 24, and outlet are in fluid communication with each other in any suitable order and form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the processing subsystem 50 as will be discussed.

Container Processing Subsystem for Extraction of Foodstuff/Beverage from Container According to a first embodiment the container processing subsystem 14 is operable: to receive the container 6 containing material; process the container 6 to extract one or more ingredients of a beverage or foodstuff therefrom, and to dispense the said ingredients into an alternate receptacle for end-user consumption. The container is generally a single-use, single-serving container such as a capsule or packet.

A container processing subsystem 14 for use with the said capsule will initially be described, an example of which is shown in FIG. 1A. The container processing subsystem 14 comprises an extraction unit 26 operable to move between a capsule receiving position and a capsule extraction position. When moving from the capsule extraction position to the capsule receiving position the extraction unit 26 may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel or port 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel or port 34B.

The capsule holder loading system 32 is operable to drive the capsule holder 30 between the capsule receiving position and the capsule extraction position.

The aforedescribed extraction unit 26 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The container processing subsystem 14 may alternatively or additionally comprise a dissolution unit configured as disclosed in EP 1472156 and in EP 1784344, which are incorporated herein by reference.

In the embodiment of the container 6 comprising a packet the container processing subsystem 14 comprises an extraction and/or dissolution unit operable to receive the packet and to inject, at an inlet thereof, fluid from the fluid supply 12. The injected fluid mixes with material within the packet to at least partially prepare the beverage, which exits the packet via an outlet thereof. The container processing subsystem 14 comprises: a support mechanism to receive an unused packet and eject a spent packet; an injector configured to supply fluid to the packet from the outlet of the fluid supply. Further detail is provided in WO 2014/125123, which is incorporated herein by reference.

Figure 1B:
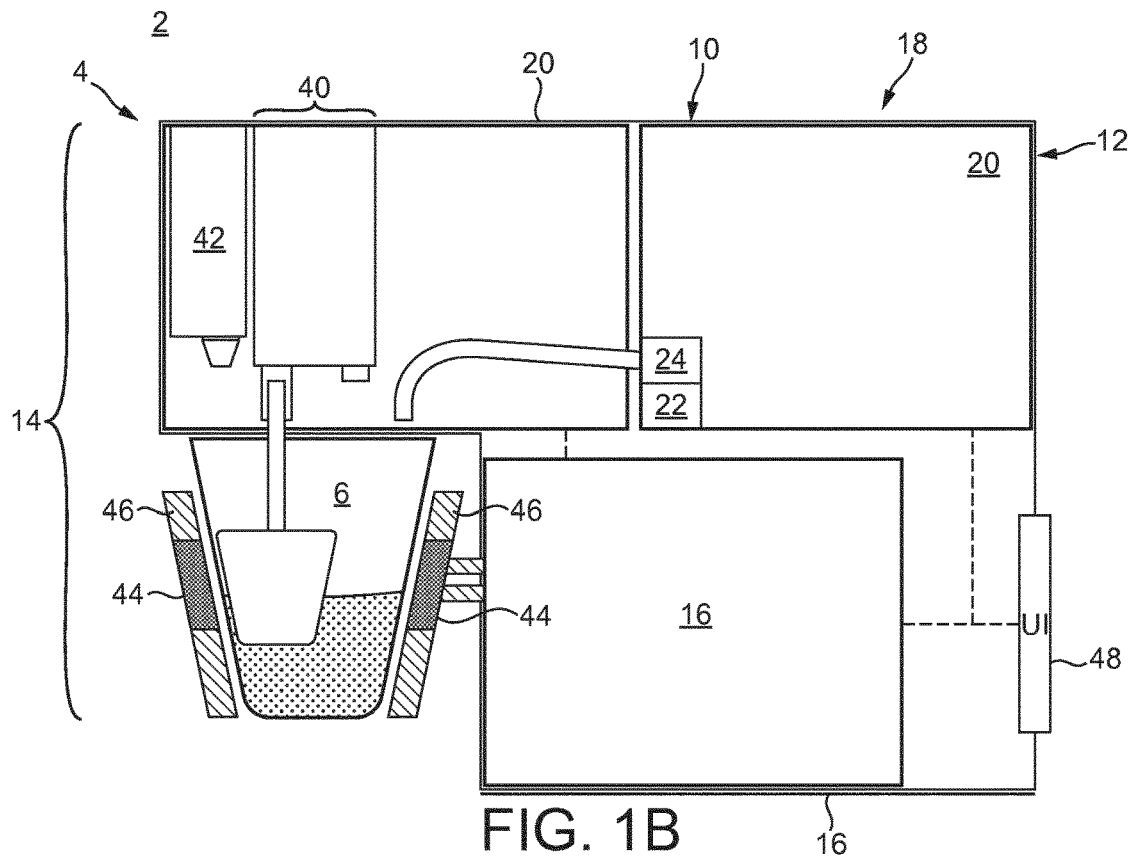

Container Processing Subsystem for Preparation of Foodstuff/Beverage in Container for End User Consumption According to a further embodiment, an example of which is shown in FIG. 1B, the container processing subsystem 14 is generally operable to prepare material stored in a container 6 that is a receptacle, such as a cup, pot or other suitable receptacle configured to hold approximately 150-350 ml of prepared product. Herein the container processing subsystem 14 comprises a mixing unit, which comprises: an agitator unit 40; an optional auxiliary product unit 42; a thermal exchanger 44; and a receptacle support 46, which will be described sequentially.

The agitator unit 40 is operable to agitate material within the receptacle for at least partial preparation thereof. The agitator unit may comprise any suitable mixing arrangement, e.g. a: planetary mixer; spiral mixer; vertical cut mixer. Typically the agitator unit 40 comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in PCT/EP2013/072692, which is incorporated herein by reference.

The auxiliary product unit 42 is operable to supply an auxiliary product, such as a topping, to the container 6. The auxiliary product unit 42 for example comprises: a reservoir to store said product; an electrically operated dispensing system to effect the dispensing of said product from the reservoir. Alternatively or additionally, the auxiliary production unit comprises a dilution and/or an extraction unit as described above to effect the dispensing from said auxiliary product from a container 6 such as a packet or a capsule.

The thermal exchanger 44 is operable to transfer and/or extract thermal energy from the container 6. In an example of transfer of thermal energy it may comprise a heater such as thermoblock. In an example of extraction of thermal energy it may comprise heat pump such as a refrigeration-type cycle heat pump.

The receptacle support 46 is operable to support the container 6 during a preparation process such that the container remains stationary during agitation of the material therein by the agitator unit 40. The receptacle support 46 preferably is thermally associated with the thermal exchanger 44 such that transfer of thermal energy can occur with a supported receptacle.

In a variant of the above, the container processing subsystem 14 further comprises a dispensing mechanism for receiving a container 6 (such as a packet or capsule) and dispensing the associated material into the receptacle, where it is prepared. Such an example is disclosed in EP 14167344 A, which is incorporated herein by reference. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing subsystem 14 comprises a mechanical actuation device configured to apply an axial load to collapse said container, an example of which is provided in the reference application.

Control Subsystem

Figure 2A:
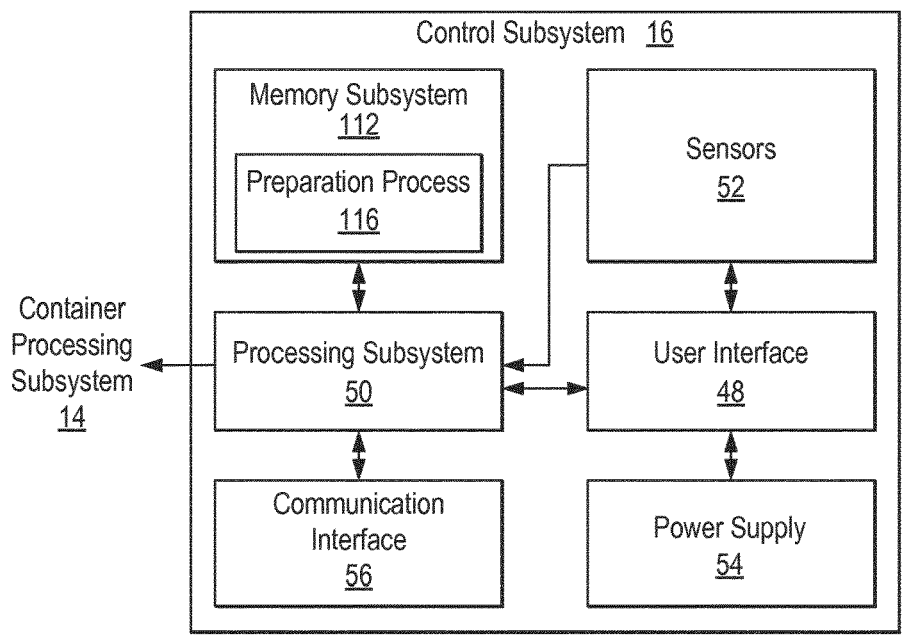
FIG. 2 is a block diagram illustrating a control subsystem and code processing subsystem for the preparation machine of FIG. 1 according to embodiments of the present disclosure.
Figure 2B:
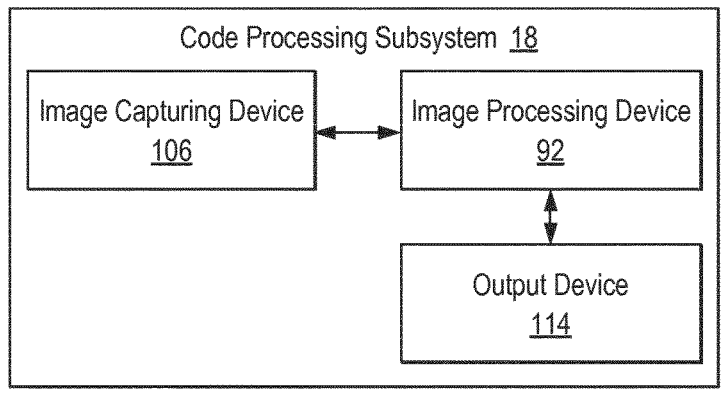

The control subsystem 16, an embodiment of which is illustrated in FIG. 2, is operable to control the container processing subsystem 14 to prepare the beverage/foodstuff. The control subsystem 16 typically comprises: a user interface 48; a processing subsystem 50; optional sensors 52; a power supply 54, optional communication interface 56, which are described sequentially.

The user interface 48 comprises hardware to enable an end user to interface with the processing subsystem 50 and hence is operatively connected thereto. More particularly: the user interface 48 receives commands from a user; a user interface signal transfers the said commands to the processing subsystem 50 as an input. The commands may, for example, be an instruction to execute a preparation process. The hardware of the user interface 48 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 52 are operatively connected to the processing subsystem 50 to provide an input for monitoring said process. The sensors 52 typically comprise one or more of the following: fluid temperature sensors; fluid level sensors; position sensors e.g. for sensing a position of the extraction unit 26; flow rate and/or volume sensors.

The processing subsystem 50 (which may be referred to as a processor) is generally operable to: receive an input, i.e. said commands from the user interface 48 and/or from the sensors 52 and/or preparation information decoded by the code processing subsystem 18, as explained further below; process the input according to program code stored on a memory subsystem (or programmed logic); provide an output, which is generally the said preparation process. The process may be executed with open-loop control, or more preferably with closed-loop control using the input signal from the sensors 52 as feedback. The processing subsystem 50 generally comprises memory, input and output system components, which are arranged as an integrated circuit, typically as a microprocessor or a microcontroller. The processing subsystem 50 may comprise other suitable integrated circuits, such as: an ASIC; a programmable logic device such as an FPGA; an analogue integrated circuit such as a controller. The processing subsystem 50 may also comprise one or more of the aforementioned integrated circuits, i.e. multiple processors.

The processing subsystem 50 generally comprises or is in communication with a memory subsystem 112 (which may be referred to as a memory unit) for storage of the program code and optionally data. The memory subsystem 112 typically comprises: a non-volatile memory e.g. EPROM, EEPROM or Flash for program code and operating parameter storage; volatile memory (RAM) for data storage. The program code typically comprises a preparation program 116 executable to effect a preparation process. The memory subsystem may comprise separate and/or integrated (e.g. on a die of the processor) memory.

The power supply 54 is operable to supply electrical energy to the processing subsystem 50, container processing subsystem 14, and the fluid supply 12 as will be discussed. The power supply 54 may comprise various means, such as a battery or a unit to receive and condition a mains electrical supply.

The communication interface 56 is for data communication between the preparation machine 4 and another device/system, typically a server system. The communication interface 56 can be used to supply and/or receive information related to the preparation process, such as container consumption information and/or preparation process information. The communication interface 56 can be configured for cabled media or wireless media or a combination thereof, e.g.: a wired connection, such as RS-232, USB, I$^2$C, Ethernet defined by IEEE 802.3; a wireless connection, such as wireless LAN (e.g. IEEE 802.11) or near field communication (NFC) or a cellular system such as GPRS or GSM. The communication interface 56 is operatively connected to the processing subsystem 50. Generally the communication interface comprises a separate processing unit (examples of which are provided above) to control communication hardware (e.g. an antenna) to interface with the master processing subsystem 50. However, less complex configurations can be used e.g. a simple wired connection for serial communication directly with the processing subsystem 50.

Code Processing Subsystem

The code processing subsystem 18 is operable: to obtain an image of a code on the container 6; to process said image to decode the encoded information including for example preparation information. The code processing subsystem 18 comprises an: image capturing device 106; image processing device 92; output device 114, which are described sequentially.

The image capturing device 106 is operable to capture a digital image of the code and to transfer, as digital data, said image to the image processing device 92. To enable the scale of the digital image to be determined: the image capturing device 106 is preferably arranged a predetermined distance away from the code when obtaining the digital image; in an example wherein the image capturing device 106 comprises a lens the magnification of the lens is preferably stored on a memory of the image processing device 92. The image capturing device 106 comprises any suitable optical device for capturing a digital image consisting of the latter discussed micro-unit code composition. The code forming a micro-unit composition, the image capturing device may have very small dimensions, for example in the magnitude of a few millimetres or less, for example less than 2 mm in length, width and thickness, thereby facilitating its integration in a foodstuff/preparation machine 4, for example in the container processing subsystem 14. Such image capturing devices are furthermore mechanically simple and reliable pieces of equipment that will not impair the machine's overall functional reliability. Examples of suitable reliable optical devices are: Sonix SN9S102; Snap Sensor S2 imager; an oversampled binary image sensor.

The image processing device 92 is operatively connected to the image capturing device 106 and is operable to process said digital data to decode information, in particular preparation information encoded therein. Processing of the digital data is discussed in the following. The image processing device 92 may comprise a processor such as a microcontroller or an ASIC. It may alternatively comprise the aforesaid processing subsystem 50, in such an embodiment it will be appreciated that the output device is integrated in the processing subsystem 50. For the said processing the image processing device 92 typically comprises a code processing program. An example of a suitable image processing device is the Texas Instruments TMS320C5517.

The output device 114 is operatively connected to the image processing device 92 and is operable to output digital data that comprises the decoded preparation information to the processing subsystem 50, e.g. by means of a serial interface.

Container

The container 6 may comprise, depending on the embodiment of the container processing subsystem 14, a: receptacle comprising material for preparation and end-user consumption therefrom; a capsule or packet comprising material for preparation therefrom. The container 6 may be formed from various materials, such as metal or plastic or a combination thereof. In general the material is selected such that it is: food-safe; it can withstand the pressure and/or temperature of the preparation process. Suitable examples of containers are provided following.

The container 6 when not in packet form generally comprises: a body portion 58 defining a cavity for the storage of a dosage of a material; a lid portion 60 for closing the cavity; a flange portion 62 for connection of the body portion and lid portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which is provided in FIG. 3A, which may generically extend to a receptacle or capsule as defined herein. The container 6 may be distinguished as a receptacle for end-user consumption therefrom when configured with an internal volume of 150-350 ml and preferably a diameter of 6-10 cm and axial length of 4-8 cm. In a similar fashion a capsule for extraction may be distinguished when configured with an internal volume of less than 100 or 50 ml and preferably a diameter of 2-5 cm and axial length of 2-4 cm. The container 6 in collapsible configuration may comprise an internal volume of 5 ml-250 ml. In embodiments, the container's cavity may be divided in a plurality of compartments, for example two, three or more compartments, each compartment containing a material possibly different from the material contained in the other compartments. The different materials of the various compartments may for example be processed simultaneously or sequentially by the container processing subsystem 14. Examples of such containers and their processing by an appropriate container processing subsystem are for example described in WO 2007/054479 A1, WO 2014/057094 A1 and unpublished application EP 17151656.0, which are all incorporated herein by reference.

Figure 3A:
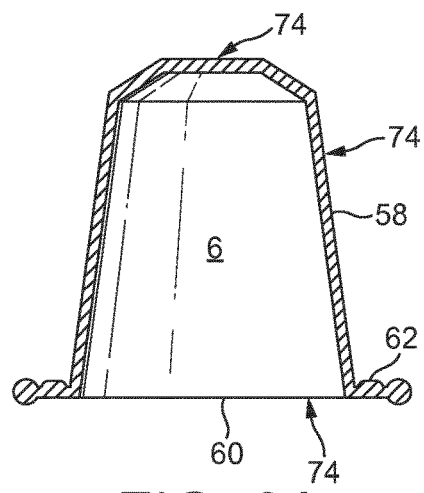
FIG. 3 is a diagrammatic drawing illustrating containers for the preparation machine of FIG. 1 according to embodiments of the present disclosure.
Figure 3B:
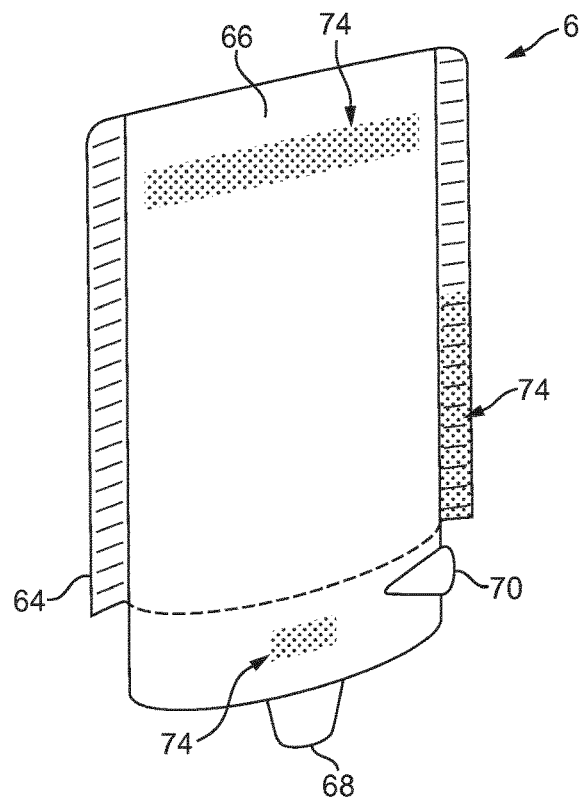

The container 6 when in packet form as shown in FIG. 3B generally comprises: an arrangement of sheet material 64 (such as one or more sheets joined at their periphery) defining an internal volume 66 for the storage of a dosage of a material; an inlet 68 for inflow of fluid into the internal volume 66; an outlet 70 for outflow of fluid and material from the internal volume. Typically the inlet 68 and outlet 70 are arranged on a body of an attachment (not shown), which is attached to the sheet material. The sheet material may be formed from various materials, such as metal foil or plastic or a combination thereof. Typically the internal volume 66 may be 150-350 ml or 200-300 ml or 50-150 depending on the application. In embodiments, the internal volume of the container may be divided in a plurality of compartments, for example two or three compartments, each compartment containing a material possibly different from the material contained in the other compartments. The different material of the various compartments may for example be processed simultaneously or sequentially by an appropriate container processing subsystem 14.

Information Encoded by Code

A code 74 of the container 6 encodes preparation information, which generally comprises information related to the associated preparation process. Depending of the embodiment of the container processing subsystem 14 said information may encode one or more parameters, which may comprise one of more of a: fluid pressure; fluid temperature (at container inlet and/or outlet to receptacle); fluid mass/volumetric flow rate; fluid volume; phase identifier, for when a preparation process is split into a series of phase, whereby each phase comprises a set of one of more of the aforesaid parameters, (typically there are 4-10 phases); phase duration (e.g. a duration for applying the parameters of a phase); recipe and/or container and/or compartment identifier, for when a recipe requires processing material contained in two or more containers and/or container compartments; container geometric parameters, such as shape/volume/number of different ingredient compartments; other container parameters e.g. a container identifier, which may for example be used to monitor container consumption for the purpose of container re-ordering, an expiry date, a recipe identifier, which may be used to look-up a recipe stored on the memory of the beverage machine for use with the container.

Specifically in respect of a preparation machine 4 such as the one illustrated in FIG. 1A said encoded parameters may comprise any one or more of a: pressure; temperature; fluid volume; fluid flow rate; time of a particular phase of preparation for which the aforesaid one or more parameters are applied for; phase identifier, e.g. an alphanumeric identifier, to identify which of a plurality of phases the aforesaid one or more parameters relate; recipe identifier; pre-wetting time, which is the amount of time the material of the container may be soaked for during an initial preparation phase; pre-wetting volume, which is the amount of fluid volume applied during said phase.

Specifically in respect of a preparation machine 4 such as the one illustrated in FIG. 1B said encoded parameters may comprise one or more of a: percentage cooling or heating power to apply (e.g. the power applied by the thermal exchanger 44); torque applied by the agitator unit 40; one or more angular velocities (e.g. a gyration and radial angular velocities W1, W2); container temperature (e.g. the temperature set by the thermal exchanger 44); time of a particular phase of preparation for which the aforesaid one or more parameters are applied for; phase identifier, e.g. an alphanumeric identifier, to identify which of a plurality of phases the aforesaid one or more parameters relate.

Arrangement of Code

The code 74 is arranged on an exterior surface of the container 6 in any suitable position such that it can be processed by the code processing subsystem 18. In the afore-discussed example of a receptacle/capsule 6, as shown in FIG. 3A, the code can be arranged on any exterior surface thereof, e.g. the lid, body and/or flange portion. In the afore-discussed example of a packet 6, as shown in FIG. 3B, the code can be arranged on any exterior surface thereof, e.g. either or both sides of the packet, including the rim.

A plurality of codes 74 can be formed on the container 6, e.g.: for read error checking; and/or with separate phases of a preparation process encoded by each code. In particular the planform of the code (as will be discussed) may comprise an at least partially tessellating shape, e.g. a rectangle such as a square, whereby the codes are formed on a container in an at least partially tessellating manner (e.g. a grid with adjacent columns aligned or with adjacent columns offset).

Composition of Code

The code 74, an example of which is shown in FIG. 4, is configured to encode the preparation information in a manner for capturing by the image capturing device 106. More particularly, the code is formed of a plurality of units 76, preferably micro-units, with a surround of a different colour: typically the codes comprise a dark colour (e.g. one of the following: black, dark blue, purple, dark green) and the surround comprises a light colour (e.g. one of the following: white, light blue, yellow, light green) or the converse, such that there is sufficient contrast for the image processing device 92 to distinguish therebetween. The units 76 may have one or a combination of the following shapes: circular; triangular; polygonal, in particular a quadrilateral such as square or parallelogram; other known suitable shape. It will be appreciated that due to formation error, (e.g. printing error), the aforesaid shape can be an approximation of the actual shape. The units 76 typically have a unit length of 50-200 µm (e.g. 60, 80, 100, 120, 150 µm). The unit length is a suitably defined distance of the unit, e.g.: for a circular shape the diameter; for a square a side length; for a polygon a diameter or distance between opposing vertices; for a triangle a hypotenuse. The units 76 are preferably arranged with a precision of about 1 µm.

Whilst the code is referred to as comprising a plurality of units it will be appreciated that the units may alternatively be referred to as elements or markers.

Typically the units 76 are formed by: printing e.g. by means of an ink printer; embossing; engraving; other known means. As an example of printing, the ink may be conventional printer ink and the substrate may be: polyethylene terephthalate (PET); aluminium coated with a lacquer (as found on Nespresso™ Classic™ capsules) or other suitable substrate. As an example of embossing, the shape may be pressed into a plastically deformable substrate (such as the aforesaid aluminium coated with a lacquer) by a stamp. The costs of forming the code on a container 6 may thus be kept low by using conventional and inexpensive technologies (e.g. ink-jet, off-set, or laser printing), such that the costs of forming the code don't significantly impact the costs of production of the container 6.

The code comprises a planform 104, within which the units 76 are arranged. The planform may be circular, rectangular (as shown in FIG. 4), or polygonal. Typically the planform has a length (i.e. a diameter for a circular or polygonal planform and a side length for a square planform) of 600-1600 µm, or about 1100 µm, which will depend on the number of parameters encoded. The code 74 of the invention allows encoding several parameter values on a small surface, thereby allowing potentially encoding all parameters necessary for the completion of complex recipes by a beverage or foodstuff preparation machine according to the fourth embodiment of the invention. The code 74 for example allows encoding preparation information required for recipes comprising several processing phases using the foodstuff contained in one or more containers and/or container compartments.

The units 76 are organised into a: data portion 78 to encode the preparation information; and a reference portion 80 to provide a reference for the data portion 78, both of which are described in more detail following.

The reference portion 80 comprises a plurality of reference units 86 defining a linear reference line r. The reference line r provides a reference direction for angular reference by the data portion 78 as will be discussed. The reference units typically define a configuration 88 defining a reference point 102 from which the reference line r extends. However in another example (not shown) a single reference unit may be arranged at the reference point, whereby said reference unit is identifiable as one or a combination of a different shape, colour, size from the other units that comprise the code.

The data portion 78 comprises a data unit 82 or a group 820 of data units 82, for example a pair of data units 82, arranged on an encoding line D that intersects the reference line r. The encoding line D is circular and is arranged with a tangent thereto orthogonal the reference line r at said intersection point. Generally the data unit or group of data units is able to occupy any continuous distance d along the encoding line D from its intersection with the reference line r, as a variable to encode a parameter of the preparation information. In this respect a wider range of information may be encoded. The continuous encoding of a parameter is particularly advantageous in encoding parameters which can have a large numerical range, e.g. torque and angular velocity. Alternatively or in combination thereof, one or more data units 82 can only occupy discrete positions only (i.e. one of a plurality of predetermined positions) along the encoding line D as a variable to encode one or more parameters.

In embodiments, the data portion 78 of the code further comprises a plurality of discrete positions 119, 118 arranged on one or more encoding lines D and/or in operative proximity to the reference line r such that they can be located using a data unit 82 or group 820 of data units 82 on a one or more encoding line D and/or the reference line r. Each discrete position 119, 118 either comprised or does not comprise a data unit 82 as will be discussed. Preferably, only the reference units 86 and the data units 82 are physically formed, e.g. printed or embossed, on the container or code support.

The encoding along the encoding line D and encoding of the discrete positions 118, 119 is discussed in more detail further below.

Detailed Description of Code

The code 74, an example of which is shown in FIG. 4, comprise the aforesaid arrangement of the encoding line D and reference line r. Note in FIG. 4 (and those following) the: reference line r, encoding line D; planform 104; encoding area 90; and various other constructional lines, are shown for illustrative purposes only, that is to say they do not require physical formation as part of the code. Rather they can be defined virtually when an image of the code is processed as will be discussed.

The encoding line D intersects the reference line r at a reference position 84. A reference position 84 may or may not comprise a reference unit 86 as will be discussed. Generally there are plurality of encoding lines D, such as 2, 3, 4, 5, which are concentrically arranged and intersect the reference line r at a plurality of different reference positions 84, whereby each has a data unit at least partially encoding a parameter. The data portion 78 generally comprises an encoding area 90, which may be defined by the encoding lines D, within the bounds of which the data units 82 are arranged.

Numbering of the reference positions 84 and the associated data units 82 and encoding line D herein is denoted by a numerical subscript, and comprises the lowest number reference position 84 proximate the configuration 88 (which will be discussed), increasing consecutively to the highest number reference position 84 distal thereto, e.g. the second reference position is $84_2$, the associated encoding line is $D_2$ and distance along said encoding line is $d_2$ as shown in FIG. 4.

The distance d is defined from the reference position 84 along the encoding line D to a position on the encoding line D, which a centre of the data unit 82 is arranged on, or arranged proximate thereto, e.g. at a position on the encoding line D which is intersected by a line through the centre of the data unit 82, whereby said line is orthogonal to the encoding line D at the point of intersection. The distance d may be defined in terms of the circumferential or angular distance.

Figure 4A:
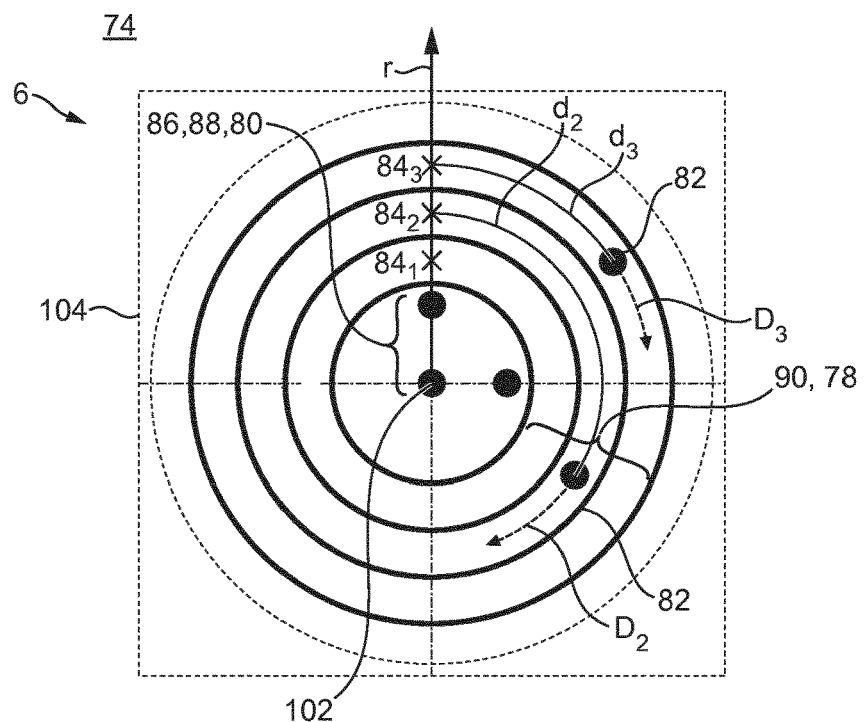
FIGS. 4-8 are plan views showing to scale codes for the containers of FIG. 3 according to embodiments of the present disclosure.

The reference portion 80 comprises m reference units 86, (three are illustrated in FIG. 4A) arranged to at least partially define a linear reference line r, wherein m numerically is at least two. In particular the reference line r extends through a plurality of points which are defined by a reference unit and/or the configuration 88, as will be discussed.

The configuration 88 comprises a characteristic arrangement of units, in particular reference units, that is not repeated elsewhere in the code. It can thus be conveniently identified when processing the code. It is preferred, for reasons of processing overhead, to have the reference units of the configuration all of the same individual configuration. Herein individual configuration is taken to mean one or more of shape, colour and size. Typically all three are the same for said units. In this way the units need only be identified as present, as opposed to in addition being identified by their individual configuration, e.g. via colour and/or shape which is more computationally intensive. The characteristic shape of the configuration can thus be identified from points, typically the centre points, of the reference units. For these reasons it is preferable to have other units that comprise the code of the same individual configuration as those of the configuration. The other units of the code may comprise all of the units or one or more of: further reference units (i.e. those in addition to those of the configuration); one or more of the data units.

Figure 4B:
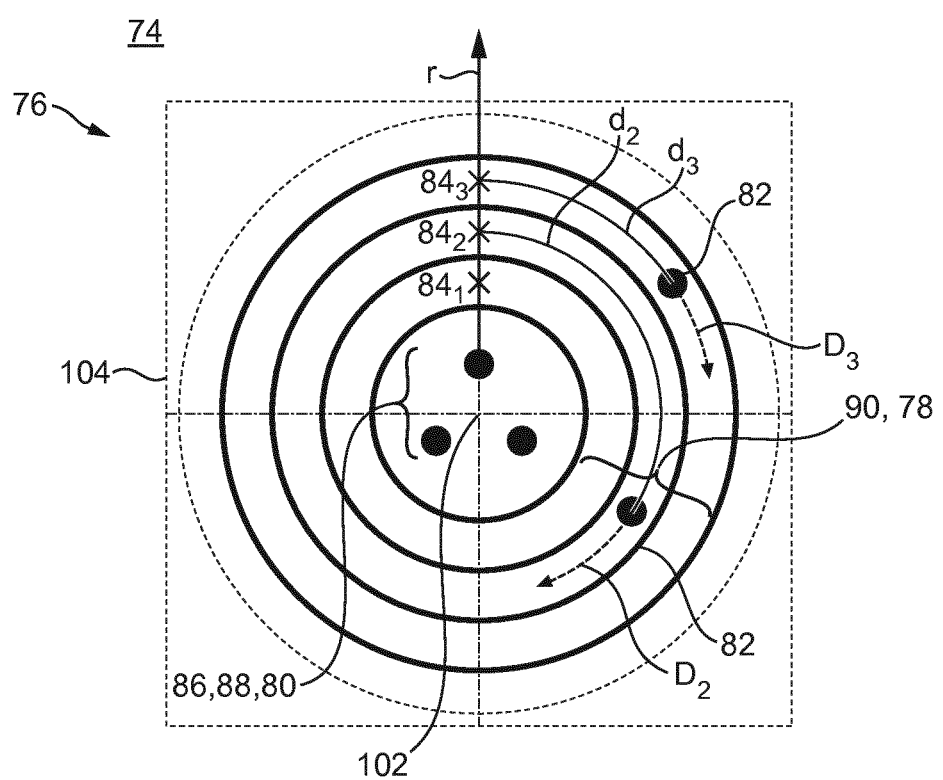
Figure 5A:
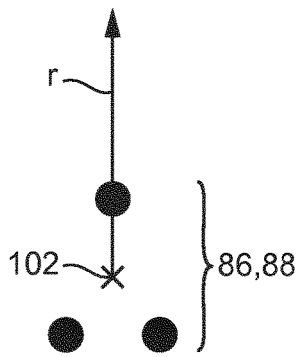
Figure 5B:
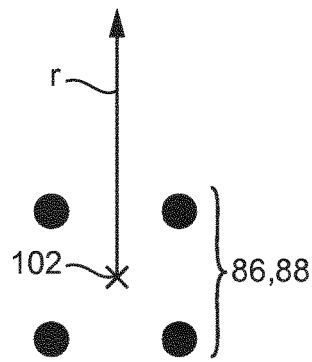
Figure 5C:
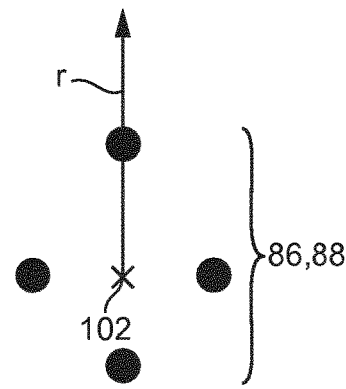
Figure 5D:
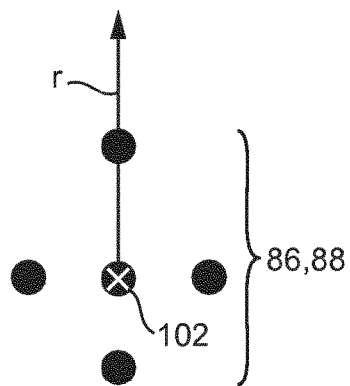
Figure 5E:
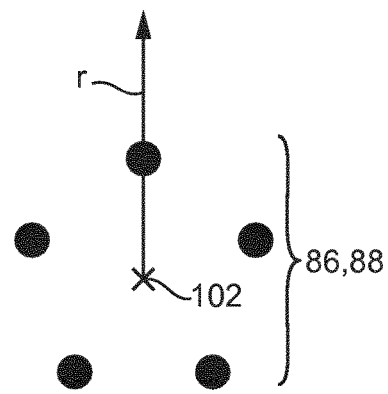
Figure 5F:
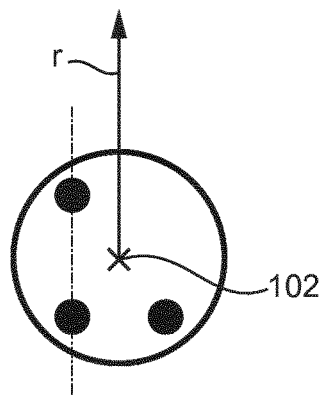

The configuration may be arranged into various shapes, such as a triangle, square, or other polygon. In general said polygon arrangement has up to 8 vertices, may or may not comprise a reference unit at the centre, and may be equiangular or asymmetric. Non-limiting examples of arrangements for the configuration are shown in FIGS. 4 and 5, wherein: FIG. 4A illustrates a right-angled triangle; FIG. 4B illustrates an equilateral triangle; FIG. 5A illustrated an isosceles triangle; FIG. 5B illustrates a square; FIG. 5C illustrates a kite; FIG. 5D illustrates a kite with a reference unit arranged at the centre; FIG. 5E illustrates a pentagon; FIG. 5F illustrates a specific arrangement of a right-angled triangle, which will be discussed. As illustrated in FIGS. 4, 5 and 6, the reference line r may extend from a reference point which is arranged at least at one selected from a group consisting of the following geometric terms in respect of the configuration: a centre of symmetry; a centroid; a line of symmetry, a midpoint between two reference units. In addition or as an alternative, said line r may extend through or parallel to one or more reference units of the configuration.

As shown in the non-limiting examples of FIGS. 4A, 5A, 5C, 5D, 5F the configuration may have an arrangement from which a single direction of the reference line r can be uniquely identified. The direction of the reference line may be approximate, which will be discussed in more detail following. Said arrangement may be achieved by configuring the arrangement to have a single line of symmetry through which the reference line r extends, whereby the spacing of the reference units may be utilised to discriminate line direction. An example of which is shown in FIGS. 5A, 5C and 5D. Said arrangement may be achieved by configuring the arrangement to have a side defined by one or more reference units through which the reference line r extends or extends parallel thereto, in particular the side may have a characteristic spacing of reference units and/or a particular orientation with respect to other reference units of the configuration. An example of which is shown in FIGS. 4A, 5F and 6A-F, whereby the units that define the orientation of the reference line r are those in the further most anti clockwise direction, or alternatively put, those which form the upstanding direction of an 'L' shape. In the particular example of FIG. 5F whereby the vertices of said triangle are arranged on a circular line, which is concentric the encoding line such that the reference point is arranged at the centre of the circular line. Such an arrangement is particularly compact as the circular line can have a diameter of 150-300 μm.

The configuration may be arranged with the reference point 102 at the centre of the circular encoding line D. One advantage is that the centre of a Polar coordinate system can be conveniently determined by locating the configuration and finding the reference point. In the illustrated embodiments the configuration is located entirely within a locus defined by the or each encoding line D. However in other embodiments it may be located external said locus or a combination of internal and external.

In embodiments the code may comprise a plurality of discrete positions 118, 119, whereby said discrete positions either comprise or do not comprise a unit. In FIGS. 6A, 6B, 6C and 6E the discrete positions 118, 119 are shown for illustrative purposes only, that is to say they do not require physical formation as part of the code, rather they can be defined virtually when an image of the code is processed as will be discussed. The discrete positions 118, 119 may be arranged in various locations within the planform 104 of the code 74.

There may be one or a plurality of the discrete positions 118, 119, e.g. any number up to 40 or 60. The discrete positions 118, 119 can be circumferentially disposed, with adjacent positions equidistant each other, about one or more circular lines which are concentric the encoding line(s) D. Alternatively the discrete positions 118, 119 can have an arbitrary arrangement.

In embodiments, discrete positions 118 are arranged external the aforedescribed locus of the or each encoding line D, wherein there is sufficient space to have a suitable plurality of said positions, such an arrangement is shown in the non-limiting illustrating examples of FIG. 6A-F. In embodiments, discrete positions 118, 119 are arranged internal said locus or a combination of internal and external as shown in the non-limiting illustrating example of FIGS. 6B-F. The location of discrete positions 118, 119 may for example be defined relative to the location of the configuration 88 of the code 74, i.e. relative to the planform 104 and orientation of the code 74, or they may be defined relative to one or more variable elements of the code, for example relative to one or more data units 82 able to occupy any continuous distance d along an encoding line D as discussed above.

In the non-limiting illustrating examples of FIGS. 6B-F, the code 74 for example comprises discrete positions 118 arranged external the locus of the encoding lines D and discrete positions 119 arranged internal said locus. The location of each discrete position 118 external the locus is preferably defined relative to the configuration 88 of reference units 86, i.e. relative to the planform and orientation of the code 74. These discrete positions 118 external the locus may thus be referred to as absolute discrete positions 118. The discrete positions 119 arranged internal the locus are for example located on one or more encoding lines D at a determined distance from the corresponding data unit 82, or group of data unit 820, that may occupy any continuous distance d along the encoding line D. These discrete positions 119 internal the locus may thus be referred to as relative discrete positions 119, as their location is relative to the variable position of a variable element of the code, namely relative to the location of a data unit, or of a group of data units 820, at a distance d that encodes a parameter.

Figure 6A:
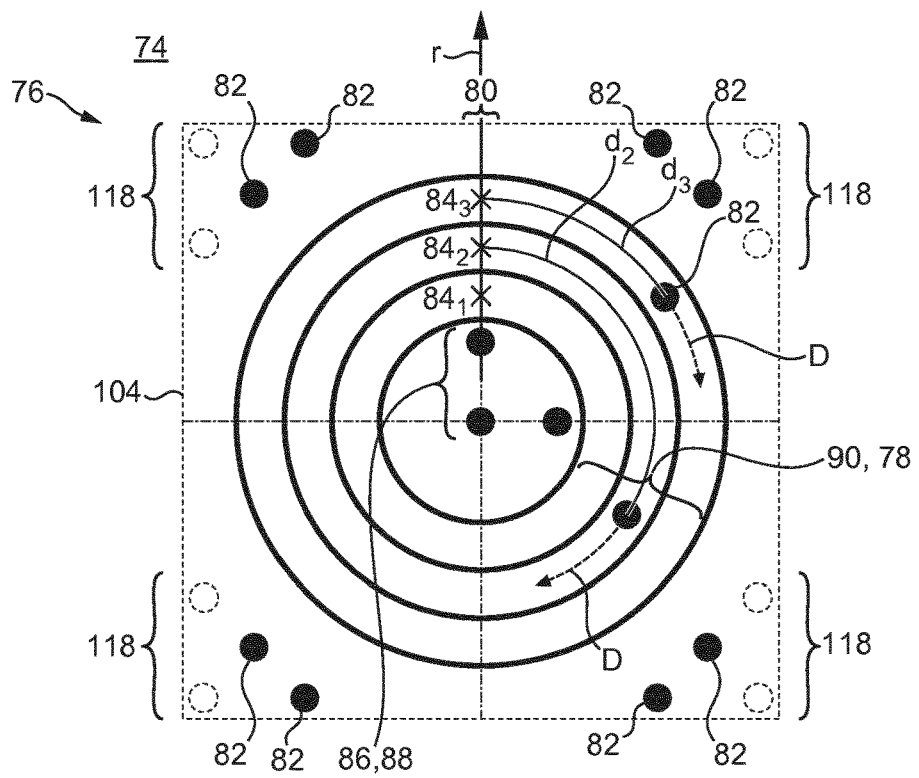
Figure 6B:
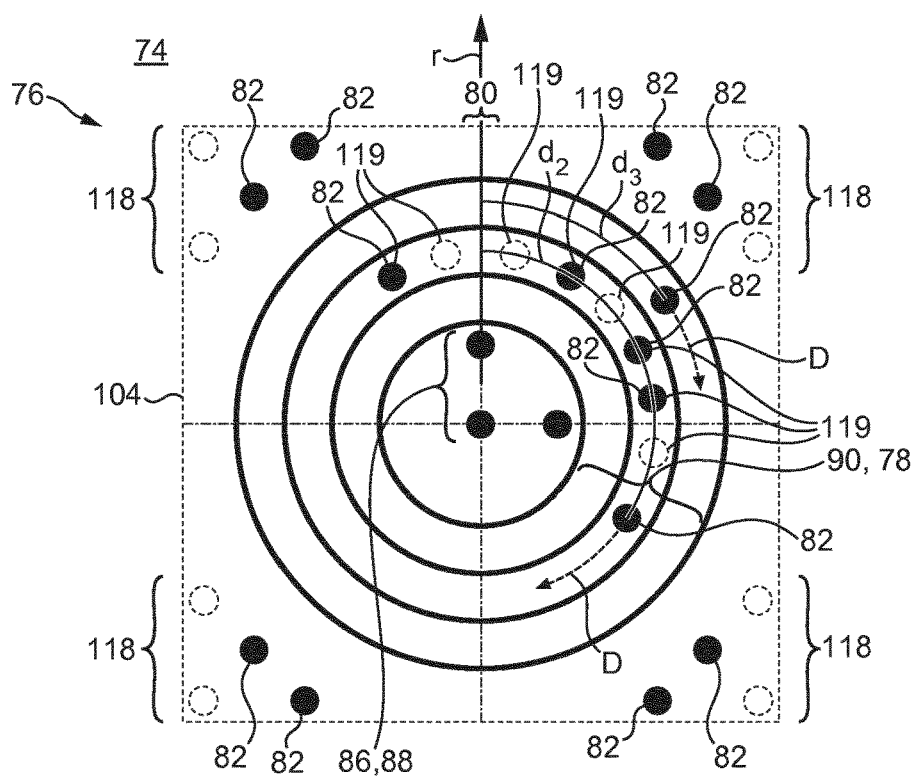
Figure 6C:
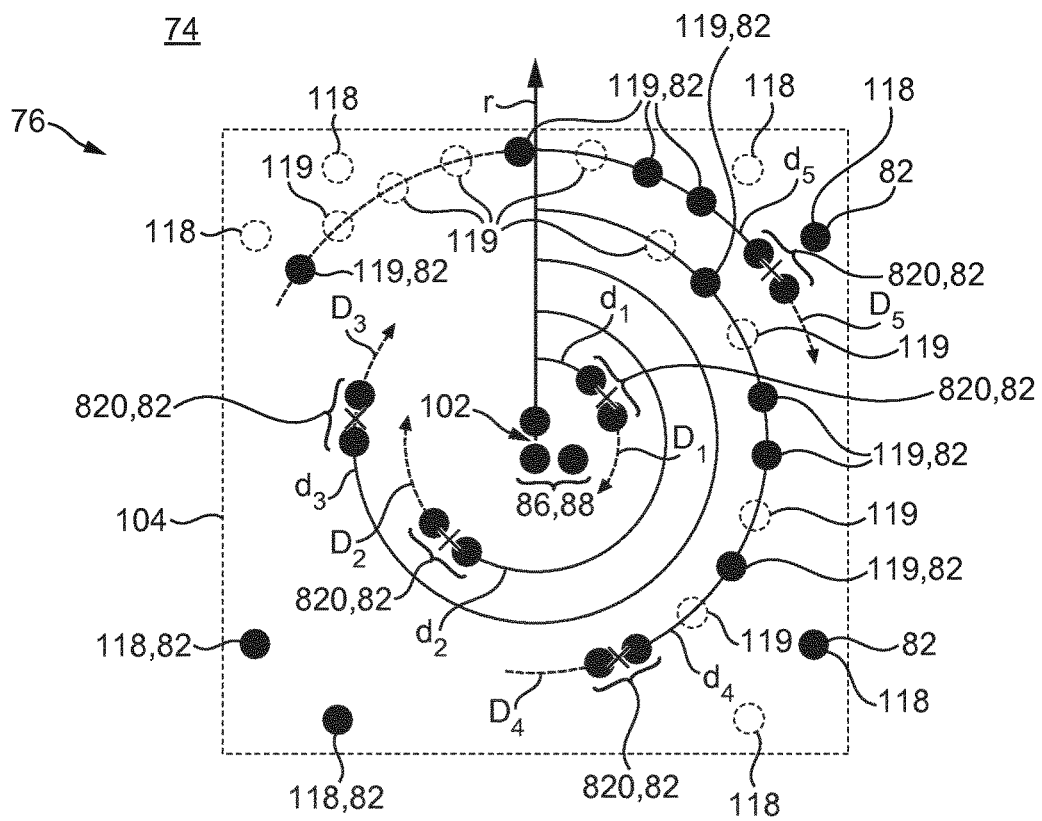

In a particular embodiment illustrated by the non-limiting example of FIG. 6C, the code 74 comprises a configuration 88 arranged internal the locus of the encoding lines D. The configuration for example comprises three reference units 86 arranged in the shape of a right-angled triangle, i.e. in an "L" shape. The midpoint between the two reference units 86 that form the upstanding direction of the "L"-shape, more particularly the midpoint between their centres, is the reference point 102 from which the reference line r extends. In the illustrated example, the orientation of the reference line r is furthermore defined by the same two reference units 86, the reference line r extending from the reference point 102 through the reference unit 86 arranged at the upper extremity of the "L"-shape, preferably through the centre of said reference unit. Other shapes of configuration, such as the one illustrated for example in FIGS. 4 and 5 are however possible within the frame of the present embodiment.

The code comprises concentric encoding lines D, for example five encoding lines $D_1$-$D_5$, on which at least one group of data units 820 may be arranged at any distance d along the corresponding encoding line D. The group of data units 820 for example comprises two data units 82 arranged at a determined distance x from each other along the encoding line D. The distance d encoded by the group of data units 820 along the corresponding encoding line D is for example determined by the midpoint between the two data units 82 of the corresponding group of data units 820, similarly to what is explained further below in relation with FIG. 8D. The encoded distance d is thus for example the distance between the reference line r and a midpoint of the group of data units 820 along the corresponding encoding line D, i.e. the average of the distance between the reference line r and the first data unit 82 of the group of data units 820 and the distance between the reference line r and the second data unit 82 of the group of data units 820. Defining the distance d encoding a parameter with a group of data units 820 as the average distance between two or more data units 82 of the group 820 and the corresponding reference position allows achieving a greater accuracy in determining the distance d and/or the corresponding angle to the reference line r. Alternatively, the distance d may be determined by the position of one data unit 82 only of the group of data units 820.

The code 74 further comprises discrete positions 119 arranged on one or more encoding lines D, whereas each discrete position 119 may comprise a data unit 82 to at least partly encode a parameter. In the illustrated example, eight discrete positions 119 are for example arranged on each of two encoding lines $D_4$, $D_5$, thereby allowing encoding eight bits of digital information on each one of these two encoding lines $D_4$, $D_5$. Other numbers of discrete positions per encoding line D, for example any number of discrete positions between 1 and 16, are however possible within the frame of the present embodiment. Discrete positions may furthermore be arranged on a different number of encoding lines D, different numbers of discrete positions being for example arranged on different encoding lines D, depending for example on the available space. The discrete positions 119 arranged on the encoding lines D are spaced apart from each other and from the closest data unit 82 of the corresponding group of units 820 by distances different from the distance x that separates two data units 82 of a group of units 820. This allows, for example upon decoding the code 74, discriminating data units 82 belonging to a group of data units 820 from data units 82 arranged at discrete positions along the same or other encoding lines D. Adjacent discrete reference positions on a same encoding line D are for example all separated from each other, e.g. their centres are separated from each other, by a same distance y. In order to avoid a confusion between the data units 82 of a group of units 820 and two data units 82 on adjacent discrete positions 119, distance y is different from distance x. Preferably, distances x and y are furthermore not multiples of each other. In embodiments, the distance between the closest data unit of a group of units and the adjacent discrete position 119 on the same encoding line D is equal or greater than the distance y between two adjacent discrete positions 119. Distance x is for example 110 μm, while distance y is 140

µm. Other values for these distances are of course possible. In particular, the distance x between two data units of a group of units 820 may be greater than the distance y between two adjacent discrete positions.

For similar reasons as the ones discussed above, distances x and y are furthermore different from the distance z that separates two adjacent reference units of the reference configuration 88, and are preferably neither multiples nor divisors of said distance z.

Alternatively, one or more encoding line D may comprise only discrete positions 119.

The code according to the embodiment illustrated in FIG. 6C may furthermore comprise further discrete positions 118 external the locus of the encoding lines D, whose locations are preferably determined relative to the planform of the code 74, i.e. relative to the location and orientation of the configuration 88 of the reference units 86. The number of discrete positions 118 external the locus of the encoding lines D may vary, depending for example on the type and quantity of information to be encoded, the available space, etc. The discrete positions 118 external the locus of the encoding lines D are preferably spaced apart from each other and from the closest encoding line $D_5$, such that a distance between two data units 82 at these discrete positions 118 may not be equal to the distance x between two data units 82 of a group of data units 820.

Figure 6D:
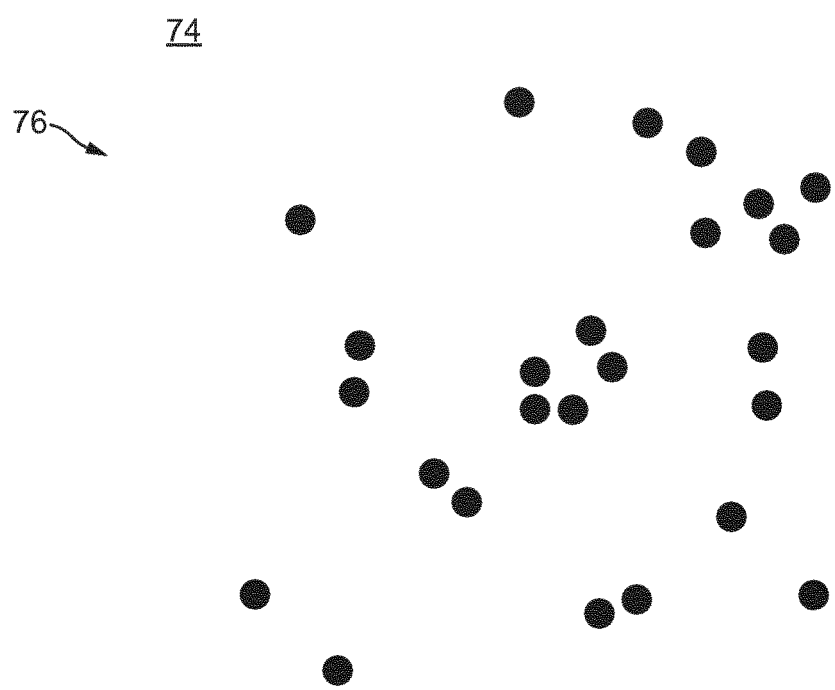

FIG. 6D shows the code 74 of FIG. 6C as it would appear for example when applied, for example printed, embossed or otherwise applied, on a container or on an attachment for a container or a machine, where only units 76 are visible, without any of the virtual encoding lines, planform boundaries and computed elements such as the reference line and distances to the group of data units.

Figure 6E:
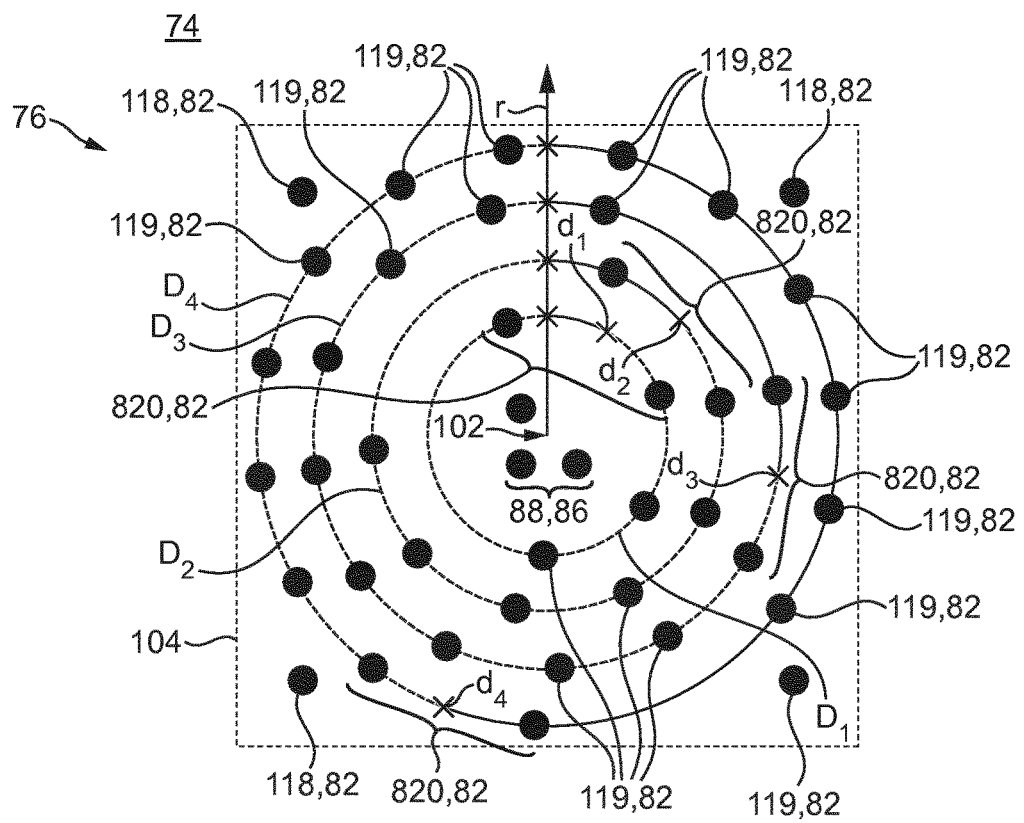

FIG. 6E illustrates another non-limiting example of an embodiment of the code 74. According to this example, the code 74 comprises a configuration 88 arranged internal the locus of the encoding lines D. The configuration for example comprises three reference units 86 arranged in the shape of a right-angled triangle, i.e. in an "L" shape. The vertices of the right-angle triangle, i.e. the three reference units 86 of configuration 88, more particularly their centres, are located on a circular line (not shown) whose centre defines the reference point 102 of the code 74 from which the reference line r extends. In the illustrated example, the orientation of the reference line r is furthermore defined parallel to a line extending through, preferably through the centres of, the reference units 86 that form the upstanding direction of the 'L' shape. Other shapes of configuration, such as the one illustrated for example in FIGS. 4 and 5 are however possible within the frame of the present embodiment.

The code comprises concentric encoding lines D, for example four encoding lines $D_1$-$D_4$, on which at least one group of data units 820 may be arranged at any distance d along the corresponding encoding line D. The group of data units 820 is for example a pair of data units comprising two data units 82 separated from each other by a determined distance x along the encoding line D. The distance d encoded by the group of data units 820 along the corresponding encoding line D is for example determined by the midpoint between the two data units 82 of the corresponding group of data units 820, similarly to what is explained further below in relation with FIG. 8D. The encoded distance d is thus for example the distance between the reference line r and a midpoint of the group of data units 820 along the corresponding encoding line D, i.e. the average of the distance between the reference line r and the first data unit 82 of the group of data units 820 and the distance between the reference line r and the second data unit 82 of the group of data units 820. Defining the distance d encoding a parameter with a group of data units 820 as the average distance between two or more data units 82 of the group 820 and the corresponding reference position allows achieving a greater accuracy, for example when encoding and/or decoding the code 74, in determining the distance d and/or the corresponding angular distance or angle to the reference line r in radians or degrees. Alternatively, the distance d may be determined by the position of one data unit 82 only of the group of data units 820.

In the non-limiting example illustrated in FIG. 6E, a first parameter is for example encoded by an angle of 25° at the reference point 102 between the reference line r and the midpoint of the group of data units 820 on encoding line $D_1$, a second parameter is encoded by an angle of 50° at the reference point 102 between the reference line r and the midpoint of the group of data units 820 on encoding line $D_2$, a third parameter is encoded by an angle of 100° at the reference point 102 between the reference line r and the midpoint of the group of data units 820 on encoding line $D_3$, and a fourth parameter is encoded by an angle of 200° at the reference point 102 between the reference line r and the midpoint of the group of data units 820 on encoding line $D_4$. The angular values indicated above, from which the distances $d_1$-$d_4$ can be calculated using the preferably stored radius of the corresponding encoding line $D_1$-$D_4$, are only illustrative and in no way limiting. In particular, these angles, and thus the corresponding distances $d_1$-$d_4$ will be modified for encoding different values of the corresponding parameters.

As explained further below, the correspondence between the distance d, and/or the corresponding angular value, and a value for the corresponding parameter is for example stored for each parameter in a look-up table, which is stored for example in a memory unit of a system according to a fourth aspect, or calculated according to a formula stored in said system.

The code 74 further comprises discrete positions 119 arranged on one or more encoding lines D, whereas each discrete position 119 may comprise a data unit 82 to at least partly encode a parameter. In the illustrated and in no way limiting example, all discrete positions 119 are for example shown to comprise a data unit 82, which may correspond to the situation where all corresponding data bits have been encoded to the value "1". It will be understood however that each discrete position 119 may comprise or not a data unit, depending on the information to be encoded at said discrete positions.

In the illustrated example, two discrete positions 119 are arranged on encoding line $D_1$, five on encoding line $D_2$, nine on encoding line $D_3$, and twelve on encoding line $D_4$, thereby allowing encoding twenty-eight bits of digital information on the encoding lines $D_1$-$D_5$, in addition to the parameters encoded by the distances $d_1$-$d_4$, or their corresponding angular value in radians or degrees as discussed above. Other numbers of discrete positions per encoding line D, for example any number of discrete positions between 1 and 16, are however possible. Discrete positions may furthermore be arranged on a different number of encoding lines D, different numbers of discrete positions being for example arranged on different encoding lines D, depending for example on the available space.

As explained above in relation with other embodiments of code 74, the discrete positions 119 arranged on the encoding lines D are spaced apart from each other and from the closest data unit 82 of the corresponding group of units 820 by distances different from the distance x that separates two data units 82 of a group of units 820. This allows, for example upon decoding the code 74, discriminating data units 82 belonging to a group of data units 820 from data units 82 arranged at discrete positions along the same or other encoding lines D. Adjacent discrete reference positions on a same encoding line D are for example all separated from each other, e.g. their centres are separated from each other, by a same distance y. In order to avoid a confusion between the data units 82 of a group of units 820 and two data units 82 on adjacent discrete positions 119, distance y is different from distance x. Preferably, distances x and y are furthermore not multiples of each other. In embodiments, the distance between the closest data unit of a group of units and the adjacent discrete position 119 on the same encoding line D is equal or greater than the distance y between two adjacent discrete positions 119. In the illustrated and non-limiting example, distance x is for example 360 μm, while distance y is 240 μm. Other values for these distances are of course possible.

The code according to the non-limiting example illustrated in FIG. 6E furthermore comprises further discrete positions 118 external the locus of the encoding lines D, whose locations are determined relative to the planform of the code 74, i.e. relative to the location and orientation of the configuration 88 of the reference units 86. The number of discrete positions 118 external the locus of the encoding lines D may vary, depending for example on the type and quantity of information to be encoded, the available space, etc. The discrete positions 118 external the locus of the encoding lines D are preferably spaced apart from each other and from the closest encoding line $D_5$, such that a distance between two data units 82 at these discrete positions 118 may not be equal to the distance x between two data units 82 of a group of data units 820. In the illustrated example the code 74 comprises four further discrete positions 118 located on a circular line external the locus of the encoding lines D, each further discrete position 118 being for example located closest to a corresponding angle of a rectangular planform of the code. The code 74 of the non-limiting example of FIG. 6E thus comprises a total of thirty-two discrete positions allowing encoding up to thirty-two bits of information by arranging or not a data unit 82 on each discrete position 119, 118.

Figure 6F:
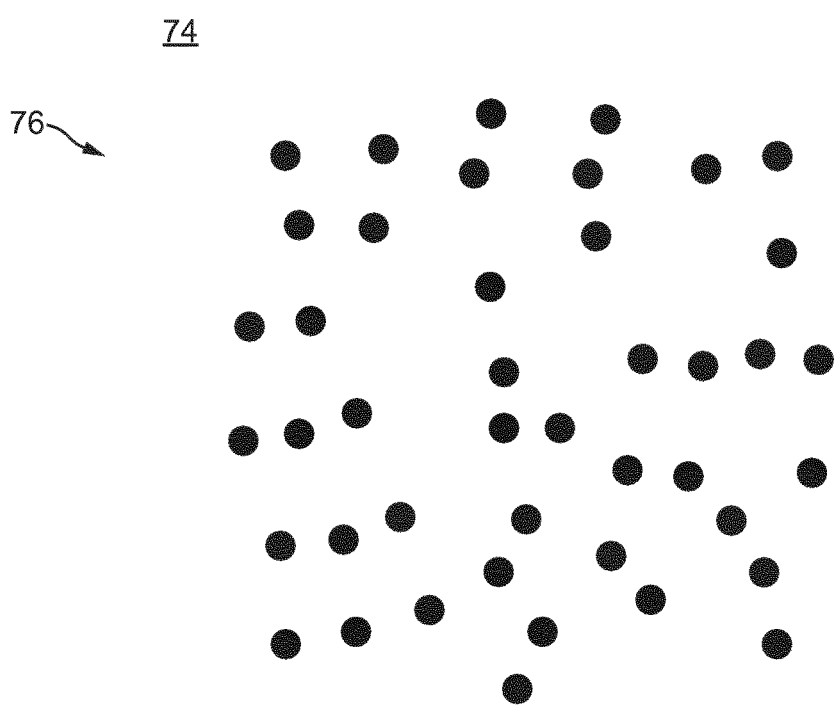

FIG. 6F shows the code 74 of FIG. 6E as it would appear for example when applied, for example printed, embossed or otherwise applied, on a container or on an attachment for a container or a machine, where only units 76 are visible, without any of the virtual encoding lines, planform boundaries and computed elements such as the reference line and distances to the group of data units.

In embodiments, and with reference to FIGS. 6A to 6F, one or more of the discrete positions 118 may form a component of the reference portion 80. In addition one or more of these discrete positions 118 may form a component of the data portion 78, such that they at least partially encode a parameter of the preparation information. One or more of the discrete positions 118 may simultaneously form a component of the reference portion 80 and of the data portion 78, such that they at least partially encode a parameter of the preparation information while at least one unit present at one of these one or more discrete positions may be used to define the reference line r of the code, in particular to accurately define, or correct, its direction.

In advantageous embodiments the code comprises discrete positions 118 in combination with a configuration 88 from which a direction of the reference line r can be identified therefrom as discussed in the above. Such embodiments are shown for example in FIGS. 6A-F. Referring to the figures it will be understood that the approximate direction of the reference line r can be determined of the configuration 88 in the manner discussed above in respect of FIG. 4A. Once the reference line r is at least approximately defined the discrete positions 118 whose locations are set relative to the configuration 88, i.e. the absolute discrete positions 118, can be determined therefrom (i.e. via a stored relationship between the reference line r, i.e. the location and orientation of configuration 88, and the locations of said absolute discrete positions 118) and checked for a unit. In the event that one or more units is present, then one or more of these units (preferably the central location of the units) can be used to refine the direction of the reference line r. An angular distance between the approximately defined reference line r and the absolute discrete position 118 of the unit 82 is for example determined, i.e. the angle in radians or degrees between a radial line to the unit (typically its centre) and the reference line r is measured, and compared with a stored value for said angle. The previously approximately defined reference line r is then accurately defined, or corrected, on the basis of the difference between the measured and the stored angular distances, and/or the previously determined reference line r is replaced by a corrected reference line r defined to extend at the stored angular distance from the corresponding absolute discrete position 118 at the reference point 102. In such an embodiment it will be understood that it is advantageous to have the discrete positions 118 which are used for this purpose arranged external the loci of the or each encoding line D, because the longer the distance is between the reference point 102 from which the reference line r extends and the discrete position(s) 118 used for determining a direction of said reference line r, the higher the precision of the determination of said direction can be.

The discrete positions 118, 119 are particularly advantageous in encoding parameters that can only assume particular values, e.g. one or more of a phase number, expiry date, container identifier. As an example of the encoding, there are n discrete positions 118, 119 each encoding a bit by the absence or presence of a data unit 82. Hence for: three encoding positions 118, 119 there are $2^3$, i.e. 8 variables; four encoding positions 118, 119 there are $2^4$, i.e. 16 variables, etc. The aforesaid variables can be used to encode: a particular number of phases, e.g. 8 or 16 phases; an expiry date, e.g. 12 variables for a month and a suitable number of variables from the product released date for the year.

As an alternative to the discrete positions being used as part of the reference portion, the reference portion may comprise a further reference unit, which is arranged at a greater radial position from said configuration than the data units and/or at a predetermined reserved radial position from said configuration. One advantage is that the reference line r can be conveniently identified by locating the configuration and then a further reference unit arranged at either the greatest or a predetermined distance therefrom. The further reference unit may be defined as arranged at said distance from the reference point. The reference line r may be defined to extend through the centre of the further reference unit. The further reference unit is preferably located external the locus defined by the or each encoding line D.

Figure 7A:
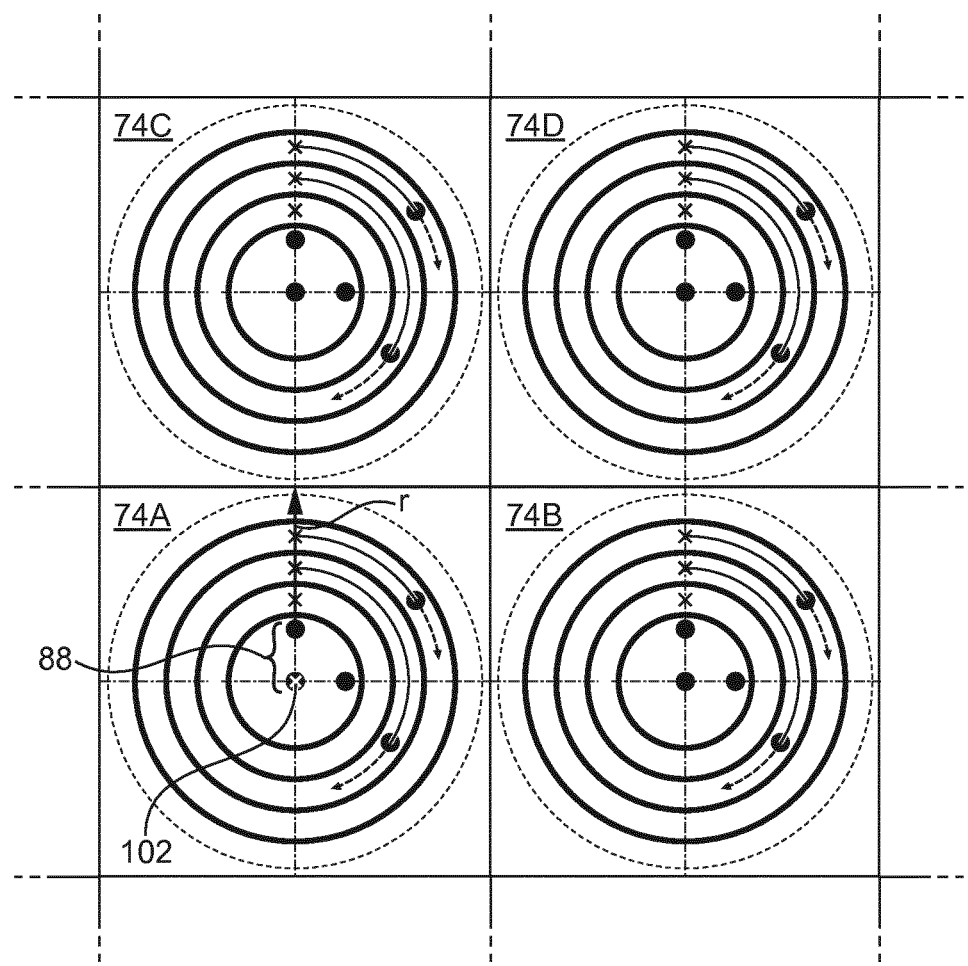
Figure 7B:
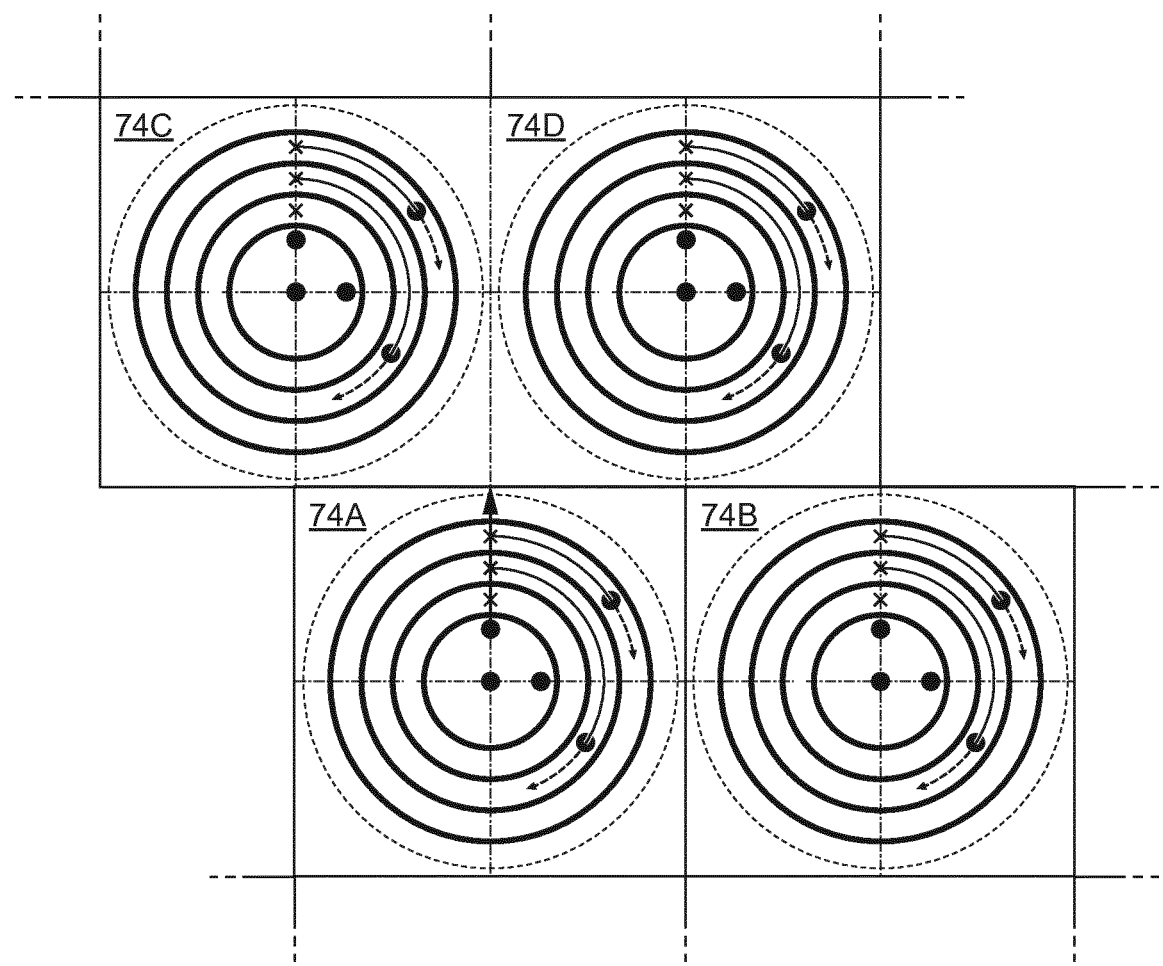

In an embodiment there may be a plurality of such codes 74, wherein a reference line r of a code 74A is determined by its configuration 88 of reference units and a like configuration of reference units of another code 74B-74D. One advantage is that no further reference units are required in a particular code other than those of its configuration 88, thus maximising the encoding density of the codes. In particular, the reference line r may extend though a reference point 102 defined by the configuration of one or more further codes, for example, a further code arranged adjacent thereto whereby the planforms of said codes share a common side. Alternatively, if an adjacent code is offset, then the reference line r may be defined to extend with said offset from the reference point of the adjacent code. FIGS. 7A and 7B illustrate non limiting examples of such embodiments. As illustrated in FIG. 7A the reference line r may be arranged to extend though a reference point defined by the configuration 88 of one or more other codes 74C, preferably of an adjacent code. As illustrated in FIG. 7B the reference line r may extend at a known position with respect to the configuration of the adjacent codes 74B, 74C, 74D.

The reference line r may be arranged a predetermined minimum distance away from the encoding area 90 of the data portion 78, e.g. by 50 μm-150 μm or 100 μm, to ensure adequate separation of the reference units 86 and data units 82, i.e. a radially extending portion is cut from its annular shape. Such an example is preferable when the reference positions comprise reference units 86.

Alternatively, as shown in the illustrated example, the reference line r extends through the encoding area 90, i.e. it radially intersects its annular shape.

The data portion 78 generally comprises an encoding area 90 which is annular whereon the data units 82 thereof are arranged, whereby the reference line r extends radially from a centre of the annular encoding area 90. The encoding lines D are concentrically arranged and extend from the reference line r about the centre of the annular encoding area 90. A point of intersection between the encoding line D and reference line r is locally orthogonal and defines the reference position 84. Each data unit 82 may have a corresponding reference unit 86 at the associated reference position 84. Advantageously the reference positions are easy to locate. Alternatively (as shown in the figures) preferably the reference position 84 does not have a reference unit 86, whereby the reference position 84 is defined virtually on the reference line r, e.g. it is interpolated by a predetermined distance from an adjacent reference unit 86. Advantageously the data units can be arranged in closer proximity to the reference line r.

More than one data unit 82 or group of data units 820 can be arranged along an encoding line D, e.g. so that multiple parameters are encoded on an encoding line D or so that each parameter has multiple values associated therewith, examples of which will be provided. A value of a parameter is encoded by the circumferential distance d of the data unit 82 from its associated reference position 84.

To ensure adequate spacing between data units on adjacent encoding lines, the optional block shaded regions arranged co-axial the encoding lines D define bounds of positions of associated data units 82. The block shaded regions are shown for illustrative purposes only, that is to say they do not require physical formation as part of the code, rather they can be defined virtually when an image of the code is processed as will be discussed.

Generally a data unit 82 can be arranged on the associated encoding line D any position up to but not extending over the reference position 84, i.e. up to 360° from the reference line r.

Encoding of Metadata

Each data unit 82 optionally encodes metadata about an associated parameter. The metadata is generally encoded discretely, i.e. it can only assume certain values. Various examples of encoding the metadata are given following.

Figure 8A:
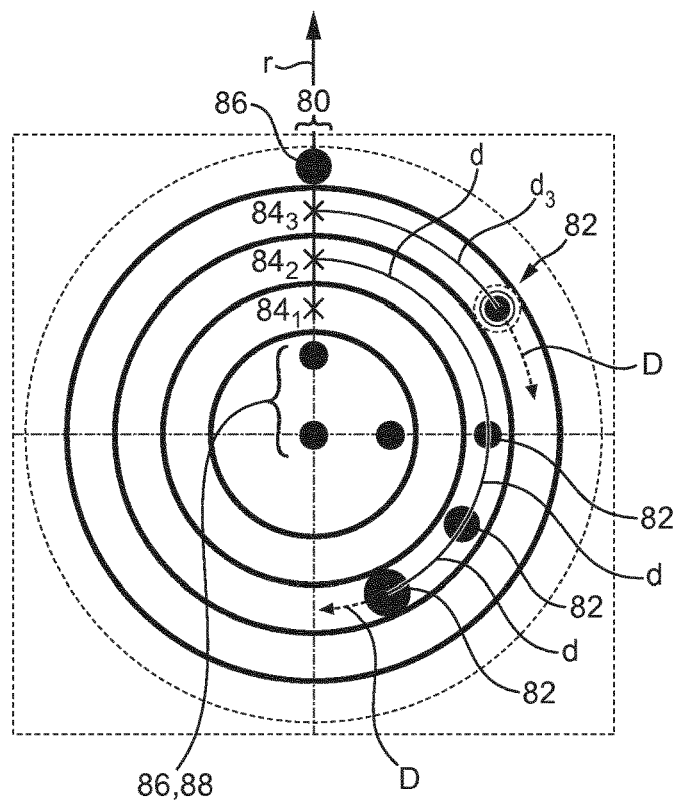

In a first embodiment, an example of which is illustrated in FIG. 8A, the metadata is encoded as a characteristic size (e.g. the size defined by the above-defined unit length or area) of the data unit 82, the size being identifiable as a variable by the image processing device 92. Particularly, the size may be one of a list of 2 or 3 or 4 particular sizes, e.g. selected from lengths of 60, 80, 100, 120 μm. In a particular example, which is best illustrated for the data unit 82 associated with the third reference position $84_3$, the size of the data unit 82 may be one of three sizes. In a particular example, which is illustrated in association with the second reference position $84_4$, there are three parameters encoded (hence three data units), the data unit 82 of each parameter being identifiable by the metadata of the three different sizes of the data units 82.

Figure 8B:
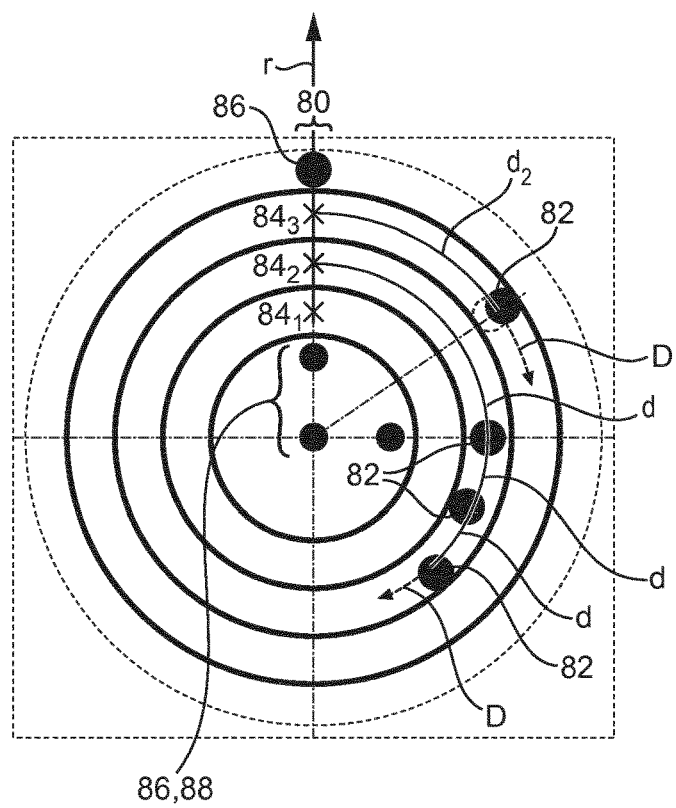

In a second embodiment, an example of which is illustrated in FIG. 8B, the metadata is encoded as a characteristic position of the data unit 82 with respect to an offset of said data unit 82 along an offset line which extends in a direction orthogonal to the encoding line D (i.e. a radial distance and/or a distance orthogonal to a tangent drawn from the encoding line D to the centre of the data unit 82). In spite of said offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 μm. The third position may be defined by a centre of the data unit 82 arranged less than a particular distance away from the encoding line D, e.g. less than 5 μm. In a particular example, which is illustrated in association with the third reference position $84_3$, the data unit 82 may be in a first or second position to encode the metadata. In a particular example, which is illustrated in association with the second reference position $84_2$, there are three parameters encoded (hence three data units), the data unit 82 of each parameter being identifiable by the metadata of the position of the data units 82.

Figure 8C:
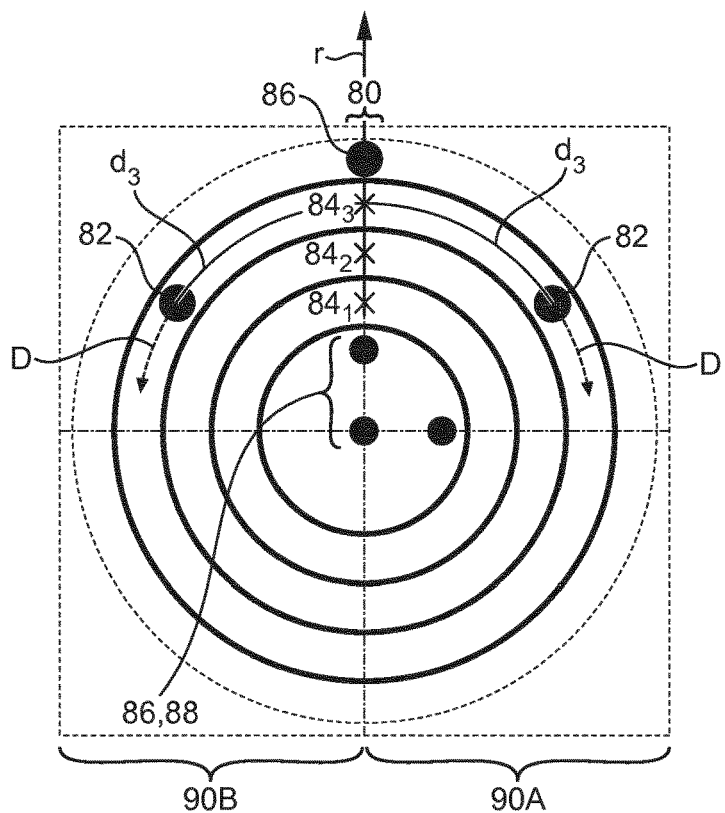

In a third embodiment, an example of which is illustrated in FIG. 8C and referring to the third reference position $84_3$, the metadata is encoded as a characteristic position of one or two data units 82 with respect to their arrangement on either side of the reference line r. As examples: a data unit 82 on the left of the reference line r may encode a negative value of the parameter and a data unit 82 on the right of the reference line r may encode a positive value of the parameter or the converse arrangement; for the same parameter a data unit 82 on the left of the reference line r may encode a mantissa, a data unit 82 one the right of the reference line r may encode an exponent or the converse arrangement; a data unit 82 on the left of the reference line r may encode the same parameter as that on the right such that an average can be taken for enhanced accuracy. In this embodiment the encoding area 90 is preferably separated into two distinct semi-circular sub-sections 90A, 90B each having an associated data unit 82 arranged therein, e.g. the maximum distance d for either is on the portion of the reference line r common to the second and third quadrants (or proximal thereto such that two data units are not arranged coincident).

Figure 8D:
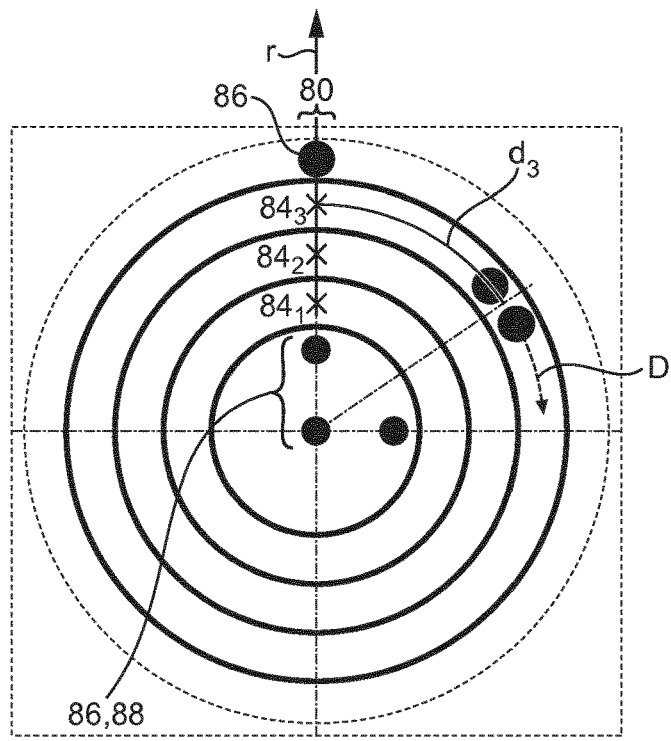

In a fourth embodiment, an example of which is illustrated in FIG. 8D and referring to the third reference position $84_3$, metadata is encoded as a plurality of data units 82 arranged along the same encoding line D, each with a different associated distance $d_n$. Advantageously an overall distance d can be determined with increased accuracy as a function (typically an average) of the distances $d_n$. In the illustrated example two data units 82 are shown wherein $d=0.5(d_1+d_2)$.

In a fifth embodiment (not shown) the metadata is encoded as a characteristic shape. For example the shape may be one of a list of: circular; triangular; polygon. In a sixth embodiment (not shown) the metadata is encoded as a characteristic colour. For example the colour may be one of a list of: red; green; blue, suitable for identification by an RGB image sensor.

The first-sixth embodiments may be suitably combined, e.g. an encoded parameter may have metadata encoded with a combination of the first and second embodiment.

Figure 8E:
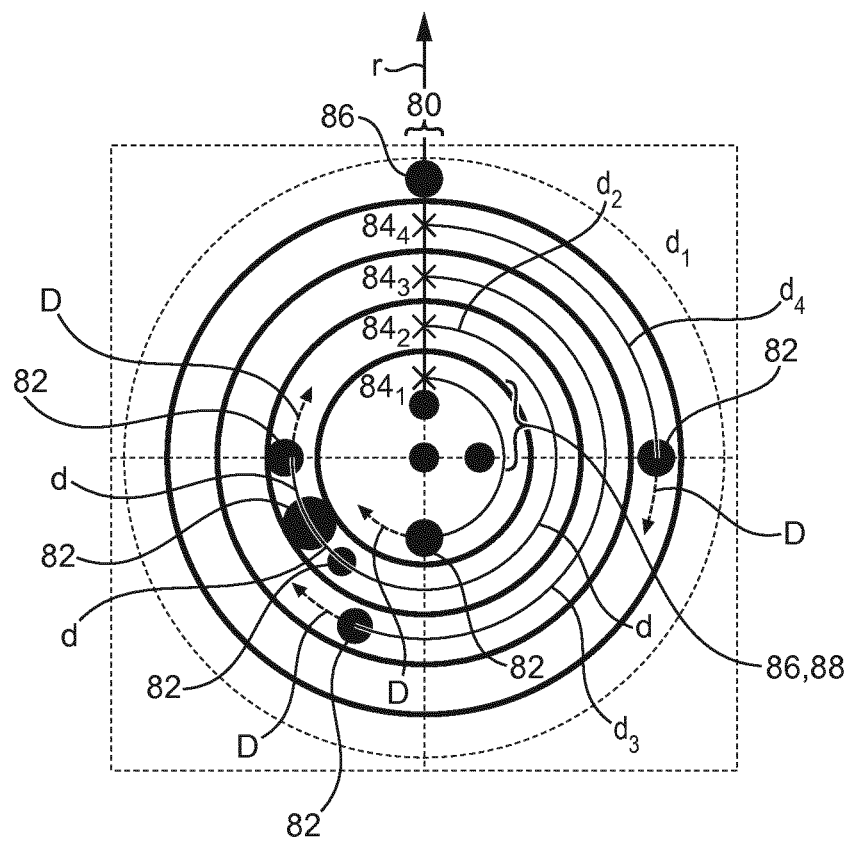

A specific example of the code 74 for use for example with a container processing subsystem 14 such as the one illustrated in FIG. 1A, is illustrated in FIG. 8E, wherein: the first 84₁, third 84₃ and fourth 84₄ reference positions 86 have associated therewith a data unit 82 that encodes a parameter without any metadata; the second reference position 84₂ has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first reference position 84 encodes a percentage cooling power to apply; the third and fourth reference positions 84 encode either of the radial angular velocity W1 and the gyration angular velocity W2; the second reference position encodes time, temperature, torque as the respective small, medium and large data units in particular positions, whereby these parameters represent triggers such that when a condition set by one of them is achieved then the phase encoded by the code 74 is compete.

Method of Processing Code

The code processing subsystem 18 processes the code 74 to determine the preparation information by: obtaining by means of the image capturing device 106 a digital image of the code; processing by means of the image processing device 92 digital data of the digital image to decode the preparation information; outputting by means of the output device 114 said decoded preparation information.

Processing of the digital data comprises: locating the units 82, 86 in the code; identifying the reference units 86 and determining therefrom a reference point and/or a reference line r; determining for data units 82 or groups of data units 820 a distance d along the associated encoding line D from the reference line r; and/or an angle in degrees or radians at the reference point 102 from the reference line r, converting the determined distance d and/or angle into an actual value of a parameter $V_p$, each of which will be described sequentially.

Locating the units 82, 86 in the code is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 106 to provide the binary image. Locations of the centre of units may be determined by a feature extraction technique such as circle Hough Transform. Different sized units may be identified by pixel integration.

Identification of the reference units 86 and determining therefrom a reference point and/or a reference line r generally comprises identifying a configuration 88 of reference units. Identifying a configuration of reference units may comprise locating reference units which have a particular unique configuration as discussed above. In particular, stored information relating to the geometry of the centre points of reference units comprising the configuration can be used to search for this arrangement in the located units.

Determining the reference line r from the configuration 88 may comprise determining from the configuration a reference point 102 from which reference line r extends. In particular, the location of the reference point in respect of the configuration may be part of the aforesaid stored information. Determining the reference line r from the configuration may further comprise determining the reference line as extending through or parallel to one or more reference units of the configuration.

Determining the reference line r from the configuration may further comprise identifying a unit arranged at least one of a plurality of discrete positions 118 as discussed above. In particular it may comprise refining an initial vector of the reference line r determined using the configuration 88 (e.g. those of FIGS. 4A, 5A, 5C and 5D) by using the unit of said at least on discrete position. Alternatively it may comprise determining a reference unit with a greater radial position from the configuration than the data units and/or at a predetermined reserved radial position from the configuration.

In embodiments comprising a plurality of such codes 74, as illustrated in FIG. 7, determining the reference line r for a first code 74A may comprise determining the reference line as extending from the reference point 102 of the configuration 88 of said first code and through or in relation to a reference point defined by the configuration of at least one other code 74B-74D. The arrangement of the reference line with respect to the reference points of further codes it will be appreciated is a stored relationship. Determining the reference line r of a code 76A for example comprises two parts, or phases: a first phase comprises approximatively determining the reference line r using the reference units 86 of configuration 88 of the code 74A itself, and a second phase comprises accurately determining, or correcting, the previously determined reference line r using configuration 88 of at least one other code 74B-74D, preferably of an adjacent code. The first phase for example comprises the steps of: determining from the configuration 88 a reference point 102 of the code 74A from which reference line r extends; approximatively determining the direction of the reference line r from the configuration 88, for example as extending through or parallel to one or more reference units 86 of code 74 A. The second phase for example comprises the steps of: identifying a like configuration of another code 74B-74D, preferably of an adjacent code 74B; determining a reference point of said another code 74B-74D; correcting the reference line r as extending through the reference point of the adjacent code 74B-74D or at a known position with respect to the reference point of the adjacent code 74B-74D.

In an embodiment of the code which does not comprise a configuration, identification of the reference units 86 and determining therefrom a reference line r, may be achieved by identification of one or a combination of: units that have a linear arrangement; units that are a predetermined and/or greatest distance apart; units that are a particular shape or size or colour; units with a particular configuration.

Determining the reference point and the reference line r when processing the code allows determining the orientation of the code in the captured image prior to decoding the information. The image of the code may thus be captured in any direction without affecting the decoding accuracy. The container bearing the code thus doesn't need to be aligned in a specific orientation relative to the image capturing device, thereby simplifying the construction of the machine and the processing of the container in the machine. In that sense, it is not necessary to require the consumer to orientate the container before inserting it into the food or beverage preparation device. Usage of a container bearing a code according to the invention is thus user-friendly.

Determining for data units 82 or groups of data units 820 a distance d along the associated encoding line D from the associated reference position 84 of the reference line r may be achieved by identification of single data units 82 that are a predetermined and/or greatest distance away from other units or by identification of groups 820 of units that are a predetermined distance apart; determining the circumferential distance or the angle at the reference point 102 from the centre of a data unit 82 or from a determined point, for example a midpoint, of a group of units 820, to the associated reference position 84. Determining the circumferential distance is conveniently achieved by the product of: an angle in radians at the reference point 102 between the reference line r and a radial line to the data unit 82 or to the determined point of the group of data units 820; and the overall circumference of the encoding line D (which is defined by the associated reference position 84). Alternatively determining said distance d may comprise determining an angular distance, i.e. by means of the angle in radians between the reference line r and a radial line to the data unit 8 (typically its centre), whereby the radial distance may be used to identify the data unit with respect to a reference position. The latter is preferably since less processing steps are required, moreover the precise radial distance is not required such that compensation for optional metadata encoding is obviated.

The determined distance d can be corrected using the magnification and/or distance of the image capturing device 106 away from the code 74 when the image was captured.

Converting the determined distance d into an actual value of a parameter $V_p$ may comprise using stored information (e.g. information stored on the memory subsystem 112) which defines a relationship between the parameter and distance d. This step may be performed at the image processing device 92 or processing subsystem 50. The relationship may be linear, e.g. $V_p \propto d$. Alternatively it may be non-linear. A non-linear relationship may comprise a logarithmic relationship, e.g. $V_p \propto \log(d)$ or an exponential relationship, e.g. $V_p \propto e^d$. Such a relationship is particular advantageous when the accuracy of a parameter is important at low values and less important at high values or the converse e.g. for the second embodiment of the container processing subsystem 14 the accuracy of the angular velocities W1, W2 of the mixing unit are more important at a low angular velocity than at a high angular velocity, hence an exponential relationship is preferable.

As the circumference of the encoding lines D decreases with proximity to the centre of the annular encoding area 90 (i.e. the location of the configuration 88 in the illustrated examples) the accuracy of the determined distance d is less. Advantageously, the parameters that require a higher level of precision can be arranged distal said centre and those that do not require a high level of precision can be arranged proximal said centre. As an example, for the second embodiment of the container processing subsystem 14, the accuracy of the angular velocities W1, W2 of the mixing unit are more important hence they are located distal said centre, and the accuracy of the percentage cooling power is less important hence it is located proximal said centre.

The aforesaid metadata about the parameter can be determined depending on the embodiment of encoding, e.g.: in the first embodiment by determining for the associated data unit 82 a unit length by feature extraction or overall area by pixel integration; in the second embodiment by determining for the associated data unit 82 an offset to the encoding line D by feature extraction; in the third and fourth embodiment by determining the centre of the associated data units by feature extraction.

Referring to the illustrative example of FIGS. 6A-F, in embodiments comprising discrete positions 118, 119, processing of the digital data may further comprise determining the location of the discrete positions 118, 119, and determining if they comprise a data unit 82, and deriving therefrom a parameter $V_p$, or a characteristic of a parameter $V_p$, which may be encoded by the data unit 82 of the encoding line D.

Determining the location of discrete positions 118, 119 may comprise using the identified position of the reference line r. It may further comprise using: stored information (i.e. information stored on the memory subsystem 112) e.g. there are a known number of discrete positions 118 arranged at known locations with respect to the position of the reference line r; and/or with respect to the arrangement of a data unit 82 or group of data unit 820 along an encoding line D which may encode the number and/or arrangement of discrete positions 119 (e.g. certain positions of the data unit 82 or group of data unit 820 encode particular configurations of the discrete positions 119). Determining if the discrete positions 118, 119 comprise a data unit 82 may comprise feature extraction or other known technique. Deriving from the presence of the data units 82 at the discrete positions 118, 119 a parameter $V_p$ may comprise using stored information (e.g. a look up table stored on the memory subsystem 112) to decode the encoded parameter(s).

According to embodiments of the code, each data unit 82 or group of data units 820 encoding a distance d along a corresponding encoding line D encodes the value $V_p$ of another parameter required for the preparation of the desired foodstuff/beverage. For example, each data unit 82 encoding a distance d along an encoding line D encodes the value of a processing parameter such as a processing temperature, a processing time, a liquid volume, a mixing speed, etc. for a particular preparation phase, different from the parameters whose values are encoded by the other such data units 82 of the code.

Machine and Container Attachments

Figure 9:
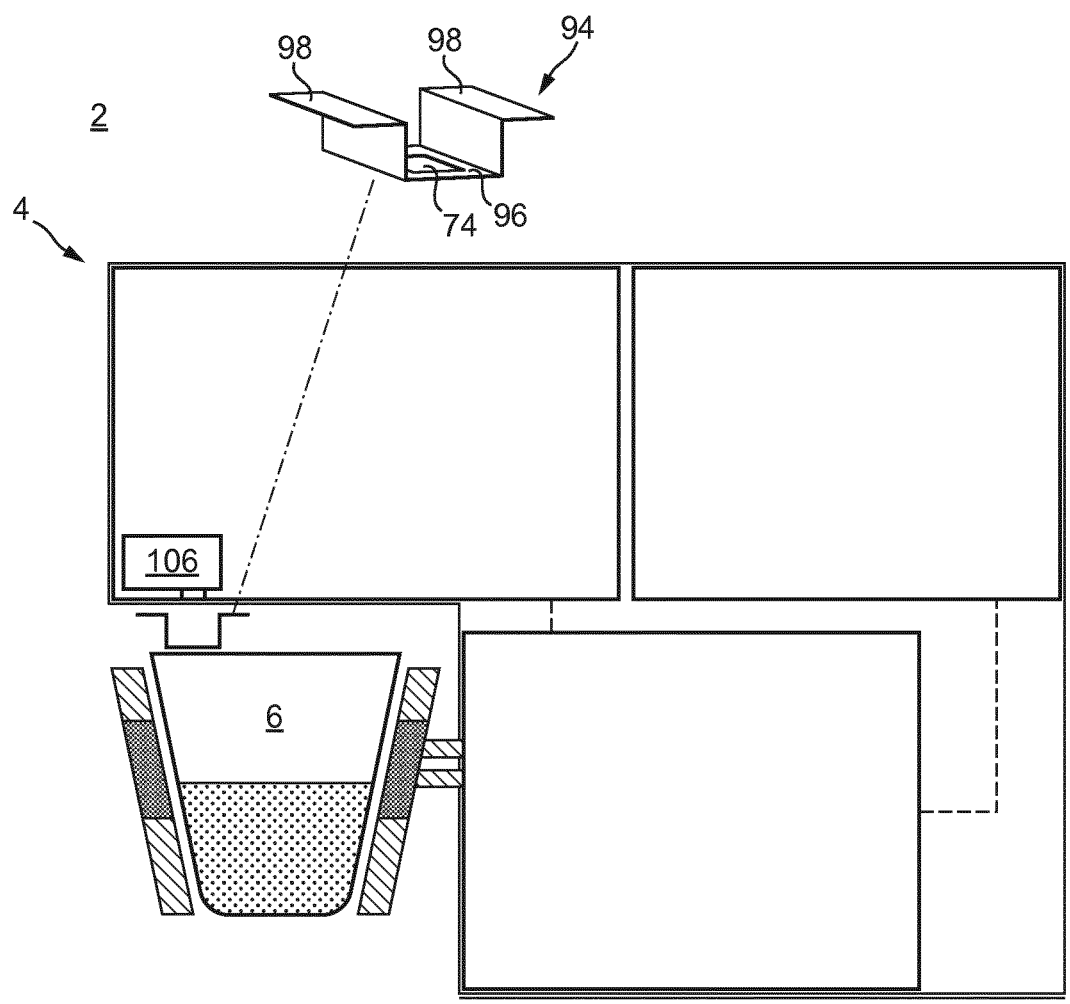
FIG. 9-10 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 9, comprises: a carrier 96 for carrying the code 74; an attachment member 98 for attachment of the carrier 96 to the machine 4 between an image capturing device 106 of said machine 4 and a container 6 received by said machine 4 and proximate said container. In this way an image of the code 74 can be captured by the image capturing device 106 as if it were attached to the container 6. Examples of suitable attachment members comprise: extensions attached to said carrier comprising an adhesive strip (as illustrated); a mechanical fastener such as a clip, bolt or bracket. The use of such an attachment 94 is particularly useful if: only one type of container 6 is used on the machine 4; a clean or other maintenance related operation is required.

Figure 10:
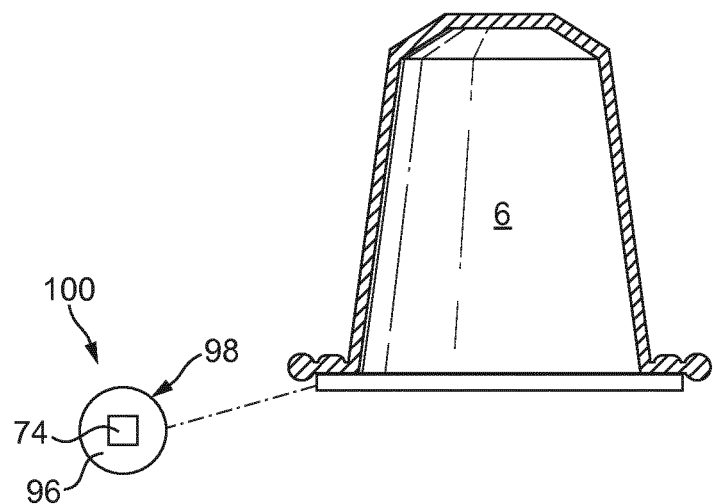

An alternate attachment 100 may comprise the afore-described code 74, arranged on a surface thereof, the attachment 100 configured for attachment to any of the afore-described containers 6. The attachment 100, an example which is illustrated in FIG. 10, comprises: a carrier 96 for carrying of the code 74; an attachment member 98 for attachment of the carrier 96 to the container 6. In this way an image of the code 74 can be captured by the image capturing device 106 as if it were formed integrally one the container 6. Examples of suitable attachment members comprise: an adhesive strip (as illustrated); a mechanical fastener such as a clip, bolt or bracket. The use of such an attachment 94 is particularly useful if: an end-user defined recipe is applied to the container 6; a clean or other maintenance related operation is required; it is more cost effective to form the code 74 on a substrate separate from the container 6 and attach said substrate to the container.

Example 1

According to this example, the beverage preparation machine is a coffee machine adapted to prepare coffee and/or coffee based beverages by brewing ground coffee contained in a container, for example in a capsule or a pouch.

Each container comprises a code printed on its outer surface to be read by the image capturing device of the machine. The code is preferably printed with a laser engraved cylinder during production of the laminate material from which the containers are made. The code is repeatedly printed on the container, preferably in a tessellating manner. The code is for example repeatedly printed on an entire surface or surface portion of the container, such that the image capturing device of the coffee machine may capture the image of at least one code, or of portions of codes allowing the image processing device to reconstitute the code, when the container is correctly inserted in the machine, independently of the particular orientation of the container in the machine.

The code is for example similar to the code illustrated in FIGS. 6E and 6F. The code comprises a reference portion comprising three reference units 86 arranged in an isosceles right-angled triangle configuration 88, i.e. arranged at the vertices of a right-angled triangle with the two legs equal. The reference units 86 define a reference point 102 at the centre of the triangle's circumcircle, i.e. at the centre of the circle passing through all vertices of the triangle, i.e. through the centres of the three reference units 86 arranged at said vertices. A reference line r is defined as extending from the reference point 102 in a direction parallel to a leg of the triangle, for example in a direction parallel to the upright portion of the "L"-shape formed by the three reference units and away from the basis of said "L"-shape. The code further comprises a data portion comprising an annular encoding area arranged around the reference portion and comprising four concentric circular encoding lines $D_1$, $D_2$, $D_3$, $D_4$ centred on the reference point 102, on which data units 82 may be arranged to encode information.

The reference units 86 and the data units 82 are preferably identical in shape, size and colour and are for example dots having a diameter of 60 μm. The length of each leg of the right-angled triangle of the reference portion is for example 125 μm, i.e. the centres of two reference units 86 arranged at the opposite ends of a same leg of the right-angled triangle are 125 μm apart. Experiments with a Sonix SN9S102-based image capturing device have shown that, in order to avoid confusion between data units 82 of the data portion and the reference units 86 of the right-angled triangle configuration 88 when using such dimension of units and such distances between the reference units, two neighbouring data units 82 on an encoding line are preferably separated by a linear distance of at least 250 μm. At a radius R μm, a linear distance of 250 μm corresponds to an angle at the centre of the encoding line of:

$$\alpha = 2 \cdot \sin^{-1}\left(\frac{250/2}{R}\right)$$

between two adjacent data units. The four encoding lines for example have respective radii of $R_1$=255 μm, $R_2$=375 μm, $R_3$=495 μm and $R_4$=615 μm. A minimal linear distance of 250 μm between two adjacent dots on a same encoding line thus corresponds to respective minimal angular distances at the centre of $\alpha_1$=58.71°, $\alpha_2$=38.94°. $\alpha_3$=29.25° and $\alpha_4$=23.45°.

The reference point 102, the reference line r and the encoding lines $D_1$, $D_2$, $D_3$, $D_4$ are not printed on the container, as illustrated by the example of FIG. 6 F. Only the reference and data units, i.e. the dots, are printed when printing the code 76. The reference point 102, the reference line r and the encoding lines $D_1$, $D_2$, $D_3$, $D_4$ are construction elements used when encoding information in order to determine the locations of the data units 82 relative to the reference units 86 before printing them on the container, and when decoding the preparation information by the code processing unit of the coffee machine in order to retrieve the parameter values encoded by the data units 82.

The encoded preparation information preferably comprises a beverage volume and temperature, and for example time and pressure information. The parameter values encoded in a code printed on a particular container are specific to the content of the container, i.e. the parameter values encoded on a particular container have been chosen to optimize the processing by the coffee machine of the material contained in the container, for example a particular type of ground coffee, in order to achieve the best possible result.

Preparation parameter values that may take on any value within a predetermined range, such as for example volume, temperature, time duration and/or cut-off pressure values, are encoded in an analogic manner by a group of data units 820 comprising two data units 82 arranged at a distance d from the reference line r along the corresponding encoding line D, while further information such as product type, roast level, phase identifier, etc., are preferably encoded in a digital manner by discrete positions 118, 119 located in the planform of the code 76, for example on at least some encoding lines, which may or may not comprise a data unit group 820.

In order to avoid confusion between two data units 82 of a same group 820 and two data units located at discrete positions 119, the linear distance between two data units 82 of a same group 820 is not a multiple nor a divider of the linear distance between two adjacent discrete positions 119 located on an encoding line D. The linear distance between two adjacent discrete positions 119 on a same encoding line is for example 250 μm, corresponding to the angular distances indicated above for each encoding line, while the linear distance between two data units 82 of a same group of data units 820 is for example 400 μm. At a radius R μm, a linear distance of 400 μm corresponds to an angle at the centre of the encoding line of:

$$\beta = 2 \cdot \sin^{-1}\left(\frac{400/2}{R}\right)$$

The four encoding lines having respective radii of $R_1=255$ μm, $R_2=375$ μm, $R_3=495$ μm and $R_4=615$ μm, a linear distance of 400 μm between two data units 82 of a same group of data units 820 thus corresponds to respective angular distances at the reference point 102 of $\beta_1=103.31°$, $\beta_2=64.46°$. $\beta_3=47.66°$ and $\beta_4=37.96°$.

A parameter value is encoded by a group of data units 820 in that both data units 82 of the group 820 are placed on either side of the point corresponding to a distance d along said encoding line, said distance d encoding the desired parameter value. The data units 82 of the group 820 are preferably arranged equidistant from said point, i.e. at an angular distance of $$\beta/2 = \sin^{-1}\left(\frac{400/2}{R}\right)$$

on either side of said point. The distance d along the encoding line D from the reference line r, or the angular distance from the reference line r, encoded by the group of data units 820 is thus an average of the distances from the reference line r along the encoding line D of both data units 82 of the group 820, respectively of the angular distances from the reference line r of both data units 82 of the group 820. In the description below, the distance of the group of unit 820 encoding the respective desired parameter value is to be understood as this average.

The temperature parameter value is for example encoded on the inner most encoding line $D_1$ having a radius $R_1=255$ μm. The temperature value may for example vary from 0° C. to 100° C. The temperature value is for example encoded on a useful angular range of 360°-60°=300° in order to avoid any risk of confusion between the lowest and the highest possible value of the range when decoding the encoded value, for example on a useful range extending from an angular distance of 30° from the reference line to an angular distance of 330° from the reference line. The temperature is for example encoded linearly, where the encoded temperature parameter value is proportional to the distance from the reference line r along the encoding line $D_1$, i.e. proportional to the angular distance from the reference line r at the reference point 102. A data unit group 820 arranged for example at an angular distance of 30° from the reference line encodes a temperature value of 0° C., a data unit group 820 arranged at an angular distance of 180° from the reference line encodes a temperature value of 50° C. and a data unit group 820 arranged at an angular distance of 330° from the reference line encodes a temperature value of 100° C. The one skilled in the art will understand that the data unit group 820 may be arranged at any position within the useful angular range of the first encoding line $D_1$ in order to correspondingly encode any desired temperature parameter value within the defined value range.

The volume parameter value is for example encoded on the second encoding line $D_2$ having a radius $R_2=375$ μm. The volume value may vary from 0 ml to 320 ml. The volume value is for example encoded linearly on a useful angular range of 360°-40°=320° in order to avoid any risk of confusion between the lowest and the highest possible value of the range when decoding the encoded value. The volume value is for example encoded on a range extending from an angular distance of 20° from the reference line r to an angular distance of 340° from the reference line r, wherein a data unit group 820 arranged for example at an angular distance of 20° from the reference line r encodes a volume value of 0 ml, a data unit group 820 arranged at an angular distance of 70° from the reference line r encodes a volume value of 50 ml and a data unit group 820 arranged at an angular distance of 340° from the reference line r encodes a volume value of 320 ml. The one skilled in the art will understand that the data unit group 820 may be arranged at any position within the useful angular range of the second encoding line $D_2$ in order to correspondingly encode any desired temperature parameter value within the defined value range.

The third encoding line $D_3$ with a radius $R_3=495$ μm is for example used for encoding a value of the cut-off pressure of the pump injecting water in the container when brewing the ground coffee contained therein. The pressure value may vary from 10 bar to 20 bar. The cut-off pressure value is for example encoded linearly on a useful angular range of 360°-30°=330° in order to avoid any risk of confusion between the lowest and the highest possible value of the range when decoding the encoded value. The cut-off pressure value is for example encoded linearly on a range extending from an angular distance of 15° from the reference line r to an angular value of 345° from the reference line r, wherein a data unit group 820 arranged for example at an angular distance of 15° from the reference line r encodes a cut-off pressure value of 10 bar, a data unit group 820 arranged at an angular distance of 180° from the reference line r encodes a cut-off pressure value of 15 bar and a data unit group 820 arranged at an angular distance of 345° from the reference line r encodes a cut-off pressure value of 20 bar. The one skilled in the art will understand that the value range may be defined differently depending on the characteristics of the machine's pump. Furthermore, the data unit group 820 may be arranged at any position within the useful angular range of the third encoding line $D_3$ in order to correspondingly encode any desired cut-off pressure parameter value within the defined value range.

Optionally, the fourth encoding line $D_4$ may be used for encoding a time duration, for example a maximal coffee preparation duration. The time duration value range may for example extend from 0 s to 330 s. The time duration value is for example encoded linearly on a useful angular range of the fourth encoding line of 360°-30°=330° in order to avoid any risk of confusion between the lowest and the highest possible value of the range when decoding the encoded value. The time duration value is for example encoded on a range extending from an angular distance of 15° from the reference line r to an angular distance of 345° from the reference line r, wherein a data unit group 820 arranged for example at an angular distance of 15° from the reference line r encodes a duration time of 0 s, a data unit group 820 arranged at an angular distance of 110° from the reference line r encodes a time duration value of 95 s and a data unit group 820 arranged at an angular distance of 345° from the reference line r encodes a time duration value of 330 s. The one skilled in the art will understand that the angular distance values indicated above are only illustrative examples and that the data unit group 820 may be arranged at any position within the useful angular range of the fourth encoding line $D_4$ in order to correspondingly encode any desired time duration parameter value within the defined value range.

The code further comprises four discrete positions 118 at predetermined known locations defined relative to the code's reference line r and/or reference point 102. The code for example comprises one discrete position 118 located close to each corner of the code's square planform 104 as illustrated in FIG. 6E, wherein the discrete positions 118 are located on the code's planform 104 and outside the fourth encoding line $D_4$.

The code for example further comprises discrete positions 119 arranged on the encoding lines $D_1$, $D_2$, $D_3$, $D_4$, at locations defined relative to the location of the previously defined location of the data unit group 820. A first discrete position of each encoding line is for example defined at a linear distance of 250 μm in a clockwise direction from the last data unit 82 of the group of data units 820, and the further discrete positions of the same encoding line are defined at regularly spaced locations on said encoding line in a clockwise direction, wherein two adjacent discrete positions of a same encoding line are separated from each other by a linear distance of 250 μm. The first encoding line $D_1$ for example comprises two discrete positions 119, the second encoding line $D_2$ comprises five discrete positions 119, the third encoding line $D_3$ comprises nine discrete positions 119 and the fourth encoding line $D_4$ comprises twelve discrete positions 119. The code thus comprises a total of 32 discrete positions that each may or may not comprise a data unit, thereby allowing encoding 32 bits of digital information, where the presence of a data unit for example corresponds to a digital "1" and no data unit present corresponds to a digital "0".

At least part of the 32 bits are for example used to encode information about the material contained in the container, for example a coffee type, origin, roasting level, etc.

In an embodiment, the coffee machine is adapted to prepare the coffee in several successive preparation phases, for example a pre-wetting phase, a high pressure extraction phase and a low pressure flow phase, wherein each phase requires different temperature, volume, pressure and time duration parameter values. The parameters for each phase are preferably encoded separately on different codes that are printed in a tessellating manner on the container. In this embodiment, at least some of the discrete positions of each code, for example two discrete positions per code, are used for encoding the number of the phase whose parameters are encoded in the particular code. The codes relating to the successive phases are then for example printed in columns over the entire surface or surface portion of the container, where a first column comprises the repeated code encoding the parameters for the first phase, a second column comprises the repeated code encoding the parameters for the second phase, a third column comprises the repeated code encoding the parameters for the third phase, etc.

When a container is inserted in the coffee machine, the machine's image capturing device captures an image of the container's surface. The digital image data is provided to the image processing device, which looks for a dot configuration 88 corresponding to the right angled triangle configuration 88 of the reference portion, preferably close to the centre of the captured image. The image processing device then determines the position of the reference point 102 and of the reference line r from the location of this configuration 88. In a further step, the image processing device looks for another dot configuration 88 of an adjacent code, preferably along the previously calculated direction of the reference line r. Knowing the relative alignment of the codes printed in a tessellating manner on the container, the image processing device corrects or adjusts the previously determined orientation of the reference line r.

The image processing device then determines the position relative to the reference line r of each data unit 82 present in the planform 104 centred on said configuration 88 in order to retrieve the encoded parameter values. The image processing device preferably first looks for pairs of data units 82 that are separated from each other by a linear distance of 400 μm and that are equidistant from the reference point 102 in order to identify the data units group 820 of the code. The average distance of the data units 82 of each group 820 is then measured and/or calculated in order to retrieve the corresponding encoded parameter values. The image processing system furthermore determines whether a data unit 82 is present or not at each discrete position 118, 119, i.e. the image processing device calculates the location of the discrete position knowing the position of the reference units 86 and of the data unit groups 820, and then searches the image data corresponding to each of these locations in order to determine whether a data unit is present or not. The decoded parameter values and the information bits corresponding to the discrete positions' data units are then transmitted to the machine's container processing subsystem in order to process the container according to said parameter values and other decoded information. If the captured digital image does not encompass any entire planform of a code, the image processing device reconstructs a planform using fragments of several neighbouring identical codes captured in the image. Optionally, the code processing subsystem uses two or more images of the container's surface and processes image data of a plurality of identical codes in order to perform error detection and/or correction. The two or more images are captured by two or more image capturing devices and/or by moving an image capturing device relative to the container. Similarly, in the case where parameters for several preparation phases are encoded in several codes, the code processing subsystem uses several images of the container's surface in order to obtain at least one image of each different code.

Example 2

According to this second example, the beverage preparation machine is a machine adapted to prepare various beverages from material contained in one or more containers, typically two containers. The material mainly comprises soluble ingredients contained in pouches and/or ingredients to be brewed such as for example ground coffee or tea leaves. The machine for example allows preparing coffee and milk-based beverages, such as latte, cappuccino, etc., milk, oat milk or tea beverages, optionally with add-ons such as for example superfood, vegetables, fruit, nuts, cereals, vitamins, etc., tea, or any combination thereof. The machine comprises a container processing subsystem comprising two dissolution units, or a dissolution and a brewing unit, or a combination thereof, in order to allow the preparation of beverages by simultaneously or sequentially processing two containers simultaneously present in the machine's container processing subsystem. The machine preferably comprises at least one image capturing device per dissolution or brewing unit in order to capture at least part of a surface of a container inserted in said unit.

Each container comprises a code printed on its outer surface to be read by the corresponding image capturing device of the machine. The code is preferably printed with a laser engraved cylinder during production of the laminate material from which the containers are made. The code is preferably repeatedly printed on the container, preferably in a tessellating manner. The code is for example repeatedly printed on an entire surface or surface portion of the container, such that the corresponding image capturing device of the machine may capture the image of at least one code, or of portions of codes allowing the image processing device to reconstitute the code, when the container is correctly inserted in the machine, independently of the particular orientation of the container in the machine.

The code is for example the code explained above in relation with example 1 and illustrated in FIG. 6E, 6F.

The temperature parameter value is for example encoded as explained above in relation with example 1 on the inner most encoding line $D_1$ having a radius $R_1$=255 µm.

The volume parameter value is for example encoded as explained above in relation with example 1 on the second encoding line $D_2$ having a radius $R_2$=375 µm.

The third encoding line $D_3$ with a radius $R_3$=495 µm is for example used for encoding a value of the cut-off pressure of the machine's pump, however within a range of 0 bar to 20 bar and/or for encoding a flow parameter value ranging from 0 ml/min to 600 ml/min depending on the applications, container type and/or material contained in the container.

Optionally, the fourth encoding line $D_4$ may be used for encoding a time duration, as explained above in relation with example 1.

The code further comprises 32 discrete positions 118, 119 as described above in relation with example 1.

At least part of the 32 bits are used to digitally encode information about the material contained in the container, for example a milk, coffee or add-on type, the origin, roasting level, flavour, etc., and/or to indicate whether a pressure parameter value or a flow parameter value is encoded on encoding line $D_3$.

In an embodiment, the machine is adapted to prepare beverages by processing one or more containers in several phases, wherein each phase requires different temperature, volume, pressure or flow, and time duration parameter values. The parameters for each phase are preferably encoded separately on different codes that are printed in a tessellating manner on the container. In this embodiment, at least some of the discrete positions of each code, for example two discrete positions per code, are used for encoding the number of the phase whose parameters are encoded in the particular code. The codes relating to the successive phases are then for example printed in columns over the entire surface or surface portion of the container, where a first column comprises the repeated code encoding the parameters for the first phase, a second column comprises the repeated code encoding the parameters for the second phase, a third column comprises the repeated code encoding the parameters for the third phase, etc.

When one or two containers are inserted in the machine, the machine's image capturing devices capture images of the containers' surface. The digital image data is provided to the image processing device, which looks in each image for a dot configuration corresponding to the right angled triangle configuration 88 of a reference portion, preferably close to the centre of the corresponding image. The image processing device then determines the position of the corresponding reference point 102 and of the corresponding reference line r from the location of this configuration 88. In a further step, the image processing device looks for another dot configuration 88 of an adjacent code in the same image, preferably along the previously calculated direction of the reference line r. Knowing the relative alignment of the codes printed in a tessellating manner on the container, the image processing device corrects or adjusts the previously determined orientation of the reference line r.

The image processing device then determines for each image the position relative to the reference line r of each data unit 82 present in the planform 104 centred on said configuration 88 in order to retrieve the encoded parameter values. The image processing device preferably first looks for pairs of data units 82 that are separated from each other by a linear distance of 400 µm and that are equidistant from the reference point 102 in order to identify the data units group 820 of the code. The average distance of the data units 82 of each group 820 is then measured and/or calculated in order to retrieve the corresponding encoded parameter values. The image processing system furthermore determines whether a data unit 82 is present or not at each discrete position 118, 119 of the code, i.e. the image processing device calculates the location of the discrete position knowing the position of the reference units 86 and of the data unit groups 820, and then searches the image data corresponding to each of these locations in order to determine whether a data unit is present or not. The decoded parameter values and the information bits corresponding to the discrete positions' data units for each code of each container are then transmitted to the machine's container processing subsystem in order to process the containers accordingly. If a captured digital image does not encompass any entire planform of a code, the image processing device reconstructs a planform using fragments of several neighbouring codes captured in the image. Optionally, the code processing subsystem uses two or more images of the container's surface and processes image data of a plurality of codes in order to perform error detection and/or correction. The two or more images are captured by two or more image capturing devices and/or by moving an image capturing device relative to the container. Similarly, in the case where parameters for several preparation phases are encoded in several codes, the code processing subsystem uses several images of the container's surface in order to obtain at least one image of each different code.

LIST OF REFERENCES

2 Beverage or Foodstuff Preparation System
4 Beverage or Foodstuff Preparation Machine
   10 Housing
      108 Base
      110 Body
   14 Container processing subsystem
      12 Fluid supply
         20 Reservoir
         22 Fluid pump
         24 Fluid thermal exchanger
   Embodiment 1
      26 Extraction Unit
         28 Injection head
         30 Capsule holder
         32 Capsule holder loading system
         34A Capsule insertion channel
         34B Capsule ejection channel
   Embodiment 2
      40 Agitator unit
      42 Auxiliary product unit
      44 Thermal exchanger
      46 Receptacle support 16 Control subsystem
 48 User interface
 50 Processing subsystem
 112 Memory subsystem
  116 Preparation program
 52 Sensors (temperature, receptacle level, flow rate, torque, velocity)
 54 Power supply
 56 Communication interface
18 Code processing subsystem
 106 Image capturing device
 92 Image processing device
 114 Output device
6 Container (Capsule/Receptacle/Packet)
Capsule/Receptacle
58 Body portion
60 Lid portion
62 Flange portion
Packet
64 Sheet material
66 Internal volume
68 Inlet
70 Outlet
74 Code
 104 Planform
 76 Unit
  78 Data portion
   90 Encoding area
   82 Data unit
   820 Group of data units
   118, 119 Discrete positions
  80 Reference portion
   84 Reference position
   86 Reference unit
   88 Configuration
   102 Reference point

The invention claimed is:

1. A container for a beverage or foodstuff preparation machine, the container for containing beverage or foodstuff material and comprising a code encoding preparation information, the code comprising a reference portion and a data portion:
the reference portion comprising reference units defining a reference line, the reference units being arranged with a configuration, wherein the configuration:
uniquely defines a single direction in which the reference line extends;
the data portion comprising a data unit arranged on an encoding line that intersects the reference line at an intersection, wherein the encoding line is circular, and wherein the data unit is arranged at a distance from the intersection, the distance being variable such that the distance at least partially encodes a parameter of the preparation information;
wherein the configuration is located entirely within a locus defined by the encoding line; and
wherein the single direction of the reference line is further defined by or corrected with a like configuration of reference units of another code.

2. The container of claim 1, wherein each reference unit of the configuration has an individual configuration, and each reference unit of the configuration has the same individual configuration.

3. The container of claim 1, wherein the configuration has a right-angled triangle arrangement, whereby vertices of the right-angled triangle are arranged on a circular line concentric to the encoding line such that a reference point is arranged at a center of the circular line.

4. The container of claim 1, wherein the code comprises a plurality of encoding lines, the encoding lines are concentrically arranged and intersect the reference line at different positions; and each encoding line has a data unit.

5. The container of claim 1, wherein a planform of the code is rectangular, wherein the encoding line is arranged within the planform, and wherein the plurality of discrete positions are arranged within the planform and are proximal one or more vertices thereof.

6. The container of claim 1, comprising a plurality of the codes formed on the container in an at least partially tessellating manner, wherein a reference line of a code is defined by a configuration of reference units and further defined by or corrected with a like configuration of reference units of another code.

7. The container of claim 1, wherein the code is formed on a surface of the container or on an attachment attached to the container.

8. A beverage or foodstuff preparation system comprising a container of beverage or foodstuff material and comprising a code encoding preparation information, the code comprising a reference portion and a data portion, the reference portion comprising reference units defining a reference line, the reference units being arranged with a configuration, wherein the configuration uniquely defines a single direction in which the reference line extends; wherein the configuration is located entirely within a locus defined by an encoding line, and wherein the single direction of the reference line is further defined by or corrected with a like configuration of reference units of another code and a beverage or foodstuff preparation machine, the preparation machine comprising:
a container processing subsystem configured to receive the container and to prepare a beverage or foodstuff therefrom;
a code processing subsystem configured to obtain a digital image of the code of the container and process the digital image to decode the encoded preparation information; and
a control subsystem configured to control the container processing subsystem using the decoded preparation information,
wherein the code processing subsystem is configured to decode the encoded preparation information by locating the reference and data units of the code and determining a reference line by:
identifying a configuration of the reference units and determining therefrom a reference point from which the reference line extends,
identifying from the configuration the single direction of the reference line,
further defining and/or correcting the single direction of the reference line with a like configuration of reference units of another code;
determining for a data unit a distance along the encoding line from the reference line; and
converting a distance into an actual value of a parameter using a stored relationship between the parameter and the distance.

9. A method of encoding preparation information, the method comprising forming a code on:
a container for a beverage or foodstuff preparation machine, the container configured for containing beverage or foodstuff material; or
an attachment for attachment to the container for the beverage of foodstuff preparation machine, the method further comprising:
- arranging reference units to define a configuration;
- at least partially encoding a parameter of the preparation information with a data portion of the code by arranging a data unit on an encoding line that intersects a reference line, the data unit being arranged on any continuous distance extending along the encoding line from the intersection as a variable for the encoding, whereby the encoding line is circular and is arranged with a tangent thereto orthogonal to the reference line at the intersection point, wherein the configuration is located entirely within a locus defined by the encoding line; and
- further arranging:
  - a data unit at one of a plurality of discrete positions arranged within a planform of the code and external to the locus defined by the encoding line, whereby the discrete positions either comprise or do not comprise a unit; and/or
  - a further code, the further code having a configuration of reference units wherein the reference line is arranged to extend though a reference point defined by the configuration of the further code or at a known offset from a reference point defined by the configuration of the further code.

* * * * *